US010745875B2

(12) United States Patent
Gamble, II et al.

(10) Patent No.: US 10,745,875 B2
(45) Date of Patent: Aug. 18, 2020

(54) SPREADER FOR SPREADING GRANULAR MATERIAL AND METHOD OF SPREADING GRANULAR MATERIAL

(71) Applicants: Robert N. Gamble, II, Watertown, WI (US); Terry C. Wendorff, Slinger, WI (US)

(72) Inventors: Robert N. Gamble, II, Watertown, WI (US); Terry C. Wendorff, Slinger, WI (US)

(73) Assignee: Sno-Way International, Inc., Hartford, WI (US)

( * ) Notice: Subject to any disclaimer, the term of this patent is extended or adjusted under 35 U.S.C. 154(b) by 193 days.

(21) Appl. No.: 14/884,426

(22) Filed: Oct. 15, 2015

(65) Prior Publication Data

US 2017/0107680 A1 Apr. 20, 2017

(51) Int. Cl.
| | |
|---|---|
| *E01H 10/00* | (2006.01) |
| *B65G 11/02* | (2006.01) |
| *B65G 11/20* | (2006.01) |
| *B65G 31/04* | (2006.01) |
| *B65G 33/10* | (2006.01) |
| *A01C 15/16* | (2006.01) |

(52) U.S. Cl.
CPC ......... *E01H 10/007* (2013.01); *B65G 11/026* (2013.01); *B65G 11/20* (2013.01); *B65G 31/04* (2013.01); *B65G 33/10* (2013.01); *A01C 15/16* (2013.01); *B65G 2201/045* (2013.01)

(58) Field of Classification Search
CPC . E01H 10/007; E01H 10/0007; B65G 11/026; B65G 11/20; B65G 31/04; B65G 33/10; B65G 2201/045; A01C 15/16

USPC ................ 239/671, 674, 675, 677
See application file for complete search history.

(56) References Cited

U.S. PATENT DOCUMENTS

| | | | | | |
|---|---|---|---|---|---|
| 2,511,514 | A | * | 6/1950 | Rosselot ................ | A01C 15/16 239/664 |
| 2,522,693 | A | * | 9/1950 | Stiteler ................. | A01C 15/16 222/615 |
| 2,594,687 | A | * | 4/1952 | Scott ..................... | A01C 15/16 222/238 |

(Continued)

OTHER PUBLICATIONS

Boss Products—The Boss Snowplow TGS 800 Tailgate Spreader Installation & Owner's Manual; 2010-2011; 26 pages; Iron Mountain, Michigan.

*Primary Examiner* — Joseph A Greenlund
(74) *Attorney, Agent, or Firm* — Reinhart Boerner Van Deuren P.C.

(57) ABSTRACT

In one embodiment, a hopper spreader apparatus for spreading granular material is provided. The hopper spreader apparatus includes a hopper, a spreading unit, and a dispensing unit. The hopper has a storage cavity for storing the granular material to be spread. The spreading unit spreads the granular material. The dispensing system transports the granular material from the hopper to the spreading unit. The dispensing system includes a conveying unit and a rotating first roll. The conveying unit conveys the granular material toward the spreading unit. The rotating first roll controls a flow of granular material from the hopper to the conveying unit. The use of the rotating roll allows for control of high flow material (such as for example dry salt) while allowing for improved collapse and break-up of low flow material (such as for example wetted sand).

35 Claims, 14 Drawing Sheets

(56) References Cited

U.S. PATENT DOCUMENTS

| | | | | | |
|---|---|---|---|---|---|
| 2,657,831 | A | * | 11/1953 | Pierce | A01C 15/16 222/272 |
| 3,158,375 | A | * | 11/1964 | Vig | E01C 19/203 414/623 |
| 3,159,406 | A | * | 12/1964 | Morr | A01C 17/00 239/670 |
| 3,236,527 | A | * | 2/1966 | Suyder | A01C 17/003 239/656 |
| 4,162,766 | A | * | 7/1979 | Ten Broeck | E01C 19/203 222/135 |
| 4,390,286 | A | * | 6/1983 | Regaldo | E01H 1/101 366/186 |
| 4,405,089 | A | * | 9/1983 | Taylor | B60P 1/38 239/656 |
| 4,411,390 | A | * | 10/1983 | Woten | B65G 53/46 241/159 |
| 4,465,239 | A | * | 8/1984 | Woten | B65G 53/46 241/159 |
| 4,934,606 | A | * | 6/1990 | Grataloup | B65G 31/04 222/281 |
| 5,031,546 | A | * | 7/1991 | Amos | B61D 7/32 105/248 |
| 5,275,335 | A | * | 1/1994 | Knight | A01C 3/063 239/675 |
| 5,829,649 | A | * | 11/1998 | Horton | B02C 13/10 222/636 |
| 5,988,535 | A | * | 11/1999 | Kime | E01H 10/007 239/172 |
| 6,109,488 | A | * | 8/2000 | Horton | E04F 21/12 222/238 |
| 6,422,490 | B1 | * | 7/2002 | Truan | A01C 15/18 239/659 |
| 6,446,879 | B1 | * | 9/2002 | Kime | E01C 19/203 239/170 |
| 7,370,818 | B2 | * | 5/2008 | Ward | E01H 10/007 239/146 |
| 8,870,101 | B2 | * | 10/2014 | Gibson | E01C 19/2025 239/674 |
| 9,073,711 | B2 | * | 7/2015 | Savarese | B65G 65/4881 |
| 9,313,945 | B2 | * | 4/2016 | Smith | A01M 9/0069 |
| 2017/0107680 | A1 | * | 4/2017 | Gamble, II | B65G 33/10 |

* cited by examiner

SPREADER FOR SPREADING GRANULAR MATERIAL AND METHOD OF SPREADING GRANULAR MATERIAL

FIELD OF THE INVENTION

This invention generally relates to spreader apparatuses for spreading granular material and methods of spreading granular material

BACKGROUND OF THE INVENTION

When the snow falls and has been cleared to a thin layer, or it rains and starts to freeze, it is desirable to make a safe tractive surface to walk and drive on in parking lots, driveways and even walk ways. The prime method for making traction is to either melt the snow and/or ice, such as using salt, to expose a tractive surface below or spread a material tractive material, such as sand, to increase the traction on the slippery surface. The tractive action of the sand on the surface of the ice gives an immediate tractive surface. Further, a combination of salt and sand can be used where the salt acts to penetrate through the snow-ice barrier and eventually melt away the majority of the snow-ice and allow the tractive surface (i.e. the pavement or a gravel road) to be exposed while the sand provides the immediate increase in traction.

Several materials may be used as a consequence: salt, sand, sand/salt and salt with a liquid additive. Typically, for large application of these materials, a spreader is used to spread the material where it is desired to melt the snow or ice and/or to provide a tractive surface. Many spreaders will be a hopper spreader apparatus that has a hopper for storing the relevant material and then a spreading unit, such as a spinner, to spread the material on the desired surface.

In many instances, the material will use, at least in part, gravity to flow the material to a system for dispensing the material from the hopper to the spreading unit. The hopper will typically have angled sides that direct the flow of material toward the system that delivers the material to the spreading unit.

Unfortunately, the materials used to combat ice and/or snow as outlined above have very different angles of repose. The angle of repose or the critical angle of repose, of a granular material is the steepest angle of descent or dip relative to the horizontal plane to which a material can be piled without slumping. At this angle, the material on the slope face is on the verge of sliding. The angle of repose for dry salt is 36 degrees, damp sand is between 45 to 90 degrees and wetted salt is between 40 to 45 degrees.

The angle of repose for bagged salt for example is around 36 degrees, as a consequence the hopper sides on most spreading containers is 40 to 45 degrees. Thus, as the material is dispensed from the hopper, the salt will fall, due to the angle of repose, towards the dispensing system.

Moist sand, however, can have an angle of repose which is 90 degrees, meaning it can stand in a vertical column. The only way to make the column collapse is to disturb the base structure, in effect toppling the upper structure over. This can be done using a vibrator and/or remove the foundation base of the material to cause the mass of material to collapse on itself One of the problems of the existing art is that there are two primary categories of spreaders, the drag chain spreader and the auger spreader. The drag chain spreader can flow a wide range of materials, however it is expensive in initial cost and upkeep. Repairs are extensive requiring prolonged down time for repairs. Very often an end user will buy a new unit in preference to repairs. Additionally, the spread quality of the drag chain spreader is not optimum and as a result too much material is consumed which is wasteful and expensive.

The auger spreader on the other hand flows high flow materials such as bagged salt, or very dry sand. Any amount of moisture added to the salt or sand causes the material flow characteristics to change drastically. This in turn requires the end user to change settings, such as on an inverted-v that is positioned above the auger to prevent jamming, on the auger spreader and in some cases may end up causing the auger to jam up. More particularly, the user is able to typically adjust the size of a flow path around the inverted-v towards the dispensing system to attempt to control the flow of material to the dispensing system. If this is not set correctly, the end user if not careful can end up with a hopper full of material that will not dispense. Further, for low flow shear resistant materials, e.g. wet sand, the material may stack up on top of the inverted-v.

Typically the flow resistant materials such as sand and wetted salt/sands are the lowest cost and yield excellent ice melting and pavement grip enhancing effects. Bagged salts on the other hand, which are high flow materials and easy to dispense, are more expensive and require special storage requirements.

The best way to destroy a cliff structure is to take out the foundational base of the material and then the top mass will cause the column to collapse on itself.

The best methods for removing this type of material from the hopper have previously involved a drag chain, which is essentially a large bottom section shearing off the bottom of the column and moving it out of the spreader unit in a slab shape. The slab is typically 15 inches wide by 3 inches tall. As the slab exits the drag chain it shears off into notable clumps as the material reaches its shear limit. The clumps drop onto the spinner and result in an uneven spread pattern on the outlet side of the spinner. Essentially the spreader pattern is not consistent but wavy or striped due to periodic clumps (also referred to as slumps) falling on the spinner. This is especially problematic for users who are concerned about even coverage and effective material distribution for either grip or melting efficacy.

A second method which is used with success requires high horsepower, expensive gearing, large auger flighting, robust auger shafting, vibrators, and in some cases inverted-v's, is the auger system. To cause the flow resistant material to move all these design elements must work in concert without jamming up the drive, without drawing a high load on the vehicle electrical system, and distributing the proper quantity of material down to the spinner.

The reason for the larger auger is to shear off the bottom of the material column. This large auger will see in excess of 1500 pounds of material weight. The auger is in turn is required to shear off the bottom and also move. The large auger must move at very slow speeds to allow the material to be dispensed at the proper rate. Matching the auger flighting so that the material is dispensed at proper rates can become a complex problem, requiring baffle adjustment, rpm adjustment, and vibrator impulses. Further, due to the large size and slow speed the large auger system can exhibit pulsing effects when moving the large slug of flow resistant material. The material will slump off in large chunks when exiting the large diameter auger much like the drag chain.

The problem with both systems is flowing high flow material, e.g. those that readily flow on their own and have an angle of repose of less than 40 degrees. The high flow material tends to flow past any flow gates and auger designs. Additionally, an inverted-v adjustment on an auger system for example that may be set for flow resistant materials is entirely different from a high flow setting.

Very often the auger will become overwhelmed in the high flow materials. The reason is that the setting for flow resistant material is designed to encourage the base of the material to collapse readily (i.e. has large openings to allow material to have minimum base support) as a result the high flow material will fall onto the auger and press with the equivalent weight of 20+ inches of material onto the auger which can cause the auger to jam.

The inverted-v, for example is designed to keep the full weight of material from exerting its weight on the auger. Flow Resistant material such as sand requires large openings to encourage the sand to gain access to the auger. Vibrators are used with flow resistant materials as well to encourage flow resistant materials to move through the larger openings. If the material is very flow resistant, the vibrator, however, may have an inverse effect, where the material instead of moving, becomes more flow resistant, or becomes packed together, eventually becoming a solid block of material and not being transferred out of the spreader at all. The material becomes bridged solidly in the spreader.

The spectrum of material flow index, or angle of repose, causes current spreader art or technology to adjust to the material type which involves variables in the spreader geometry. The auger system requires a user to be very aware of the material type and adjust the baffles of the spreader accordingly. As a result, auger spreader users typically use bagged salt, because the flow index is very predictable and consistent. Drag chain spreader users typically choose the drag chain spreader so as to be able to spread a wide range of materials. Unfortunately, they are stuck with poor spread quality, excessive flow quantity and road-transport-spillage especially when using high flow materials.

A further problem experienced by current spreaders is that the emptying profile for both drag chain spreaders and auger spreaders causes an uneven weight distribution during spreader use. More particularly, the spreader will typically dispense the material from the front of the hopper, i.e. furthest from the spinner, first. When the spreader is located in the bed of a vehicle, this translates into vehicle handling problems where the weight gradually shifts toward the rear of the vehicle which can cause the front steering to become less tractable.

As such, there is not a single system that currently handles materials that flow easily and that are flow resistant as well as provides a more uniform emptying profile.

BRIEF SUMMARY OF THE INVENTION

Embodiments of the present invention relate to new and improved spreaders for spreading granular product and particular hopper spreaders that have a hopper for storing the granular product and a spreading unit that spreads the granular product. Some embodiments provide improved handling of both materials that flow easily as well as materials that are flow resistant.

In one embodiment, a hopper spreader apparatus for spreading granular material is provided. The hopper spreader apparatus includes a hopper, a spreading unit, and a dispensing unit. The hopper has a storage cavity for storing the granular material to be spread. The spreading unit spreads the granular material. The dispensing system transports the granular material from the hopper to the spreading unit. The dispensing system includes a conveying unit and a rotating first roll. The conveying unit conveys the granular material toward the spreading unit. The rotating first roll controls a flow of granular material from the hopper to the conveying unit. The use of the rotating roll allows for control of high flow material (such as for example dry salt) while allowing for improved collapse and break-up of low flow material (such as for example wetted sand).

In a particular embodiment, the first roll is positioned at least partially gravitationally above the conveying unit. The first roll is used to regulate the gravitational flow of the material from the hopper to the conveying unit.

In a particular embodiment, the conveying unit is located within a trough region. The trough region defines a mouth. The mouth opens towards the storage cavity of the hopper. The granular material within the hopper enters into the trough region through the mouth of the trough region. The first roll is positioned adjacent the mouth and limits the flow of granular material from the hopper into the trough region through the mouth. The first roll carries, at least a portion of, the granular material from the hopper to the trough region through the mouth.

In a particular embodiment, the conveying unit is located within a trough region. The trough region includes a mouth. The mouth opens towards the storage cavity of the hopper. Granular material within the hopper enters into the trough region through the mouth. The first roll is positioned adjacent the mouth. An outer periphery of the first roll includes at least one pocket portion that dispenses a predetermined volume of the granular material into the trough region as the first roll rotates about a first roll axis of rotation.

In a particular embodiment, the first roll is formed by a cylindrical body and at least one radially outward extending piece of flighting. The piece of flighting defines, at least, a portion of the at least one pocket portion.

In a particular embodiment, the first roll is formed by a cylindrical body and a plurality of radially outward extending pieces of flighting. The pieces of flighting are angularly spaced apart about the first roll axis of rotation. The pieces of flighting may be unitarily formed with the cylindrical body or separately formed and the attached thereto. Angularly adjacent pieces of flighting define a pocket portion therebetween.

In a particular embodiment, the pieces of flighting extend axially along the cylindrical body in a non-planar fashion. For example, the flighting may extend in a helical pattern around the rotational axis of the cylindrical body. Further, some pieces of flighting may extend angularly in a first direction about the rotational axis while other pieces (typically axially offset along the rotational axis) may extend angularly in a second direction about the rotational axis.

In a particular embodiment, the mouth defines an inlet side and an outlet side. The pocket portion enters the trough region through the inlet side of the mouth and the pocket portion exits the trough region through the outlet side of the mouth as the first roll rotates about the first roll axis of rotation. The trough region defines a first roll mating region proximate the inlet side of the mouth. An outer periphery of the first roll substantially mates with the first roll mating region to inhibit a free flow of granular material into the trough region from the storage cavity between the first roll and the first roll mating region.

In a particular embodiment, the first roll mating region extends angularly about the first roll axis of rotation a first amount and the at least one pocket portion extends angularly about the first roll axis of rotation a second amount, the first amount being at least seventy five percent of the second amount. In a more particular embodiment, the first amount is at least equal to the second amount.

In a particular embodiment, the first roll and the hopper define an inlet portion of the mouth at the inlet side of the mouth defining a clearance gap having a gap width between the outer periphery of the first roll and the hopper. The gap width being such that less than fifteen percent of the granular material from the hopper flows to the conveying unit without being conveyed by the first roll. In a more particular embodiment, the gap width may be adjustable so as to better accommodate different size granular material or granular material having different flow characteristics.

In a particular embodiment, the mouth defines an inlet side and an outlet side. The pocket portion enters the trough region through the inlet side of the mouth and the pocket portion exits the trough region through the outlet side of the mouth as the first roll rotates about the first roll axis of rotation. The inlet side of the mouth defines a first clearance between the outer periphery of the first roll and the trough region. The outlet side of the mouth defines a second clearance between the outer periphery of the first roll and the trough region. The first and second clearances are such that no more than 10% of the granular material flows from the hopper to the trough region without being conveyed by the first roll within the at least one pocket portion. In a more particular embodiment, at least one of the first and second clearances is adjustable to accommodate granular materials having different flow characteristics and or different sizes.

In a particular embodiment, the outer periphery of the first roll cooperates with the mouth and the trough region such that no more than 10% of the granular material flows from the hopper to the trough region without being conveyed by the first roll within the at least one pocket portion.

In a particular embodiment, the at least one pocket portion includes at least two pocket portions.

In a particular embodiment, the first roll controls the flow of granular material from the hopper to the conveying unit at substantially an uniform rate along the length of the first roll.

In a particular embodiment, the conveying unit has a maximum conveying rate at which granular material can be conveyed toward the spreading unit. The first roll controls a total flow of granular material from the hopper to the conveying unit to be substantially no greater than the maximum conveying rate.

In a particular embodiment, the conveying unit is a drag chain.

In a particular embodiment, the conveying unit is an auger.

In a particular embodiment, the auger rotates about an auger axis of rotation and the first roll rotates about a first roll axis of rotation that is substantially parallel to the auger axis of rotation.

In a particular embodiment, the auger conveys the granular material in a direction generally parallel to the auger axis of rotation. The first roll conveys the granular material to the auger in a direction generally perpendicular to the auger axis of rotation and the first roll axis of rotation. This direction is also substantially parallel to gravity.

In a particular embodiment the auger and the first roll are operably coupled by a transmission and are driven by a single drive motor.

In a particular embodiment, the transmission is configured such that the auger rotates at a first rate and the first roll rotates at a second rate that is less than the first rate.

In a particular embodiment, a first motor is coupled to the auger to rotate the auger at a first rate of rotation. A second motor coupled to the first roll to rotate the first roll at a second rate of rotation. The first and second motors are independently controllable to independently control the first and second rates of rotation.

In a particular embodiment, the spreading unit is a spinner assembly that rotates to spread the granular material.

In a particular embodiment, a rotating second roll is provided. The first and second rolls are counter-rotating rolls and control the flow of granular material from the hopper to the conveying unit. The first and second rolls rotate about axes of rotation that are parallel to one another.

In one embodiment, a method of spreading granular material is provided. The method includes storing granular material in a hopper. The method includes spreading the granular material using a spreading unit. The method includes transporting the granular material from the hopper to the spreading unit using a dispensing system. This includes conveying the granular material toward the spreading unit with a conveying unit and controlling a flow of granular material from the hopper to the conveying unit with a rotating first roll.

In a particular method, controlling a flow of granular material from the hopper to the conveying unit with a rotating first roll includes supplying granular material to the conveying unit from the rotating first roll at a uniform rate along a length of the rotating first roll. The length being generally aligned with the rotational axis about which the first roll rotates.

In a particular method, the conveying unit can convey the granular material toward the spreading unit at a maximum rate. The step of controlling a flow of granular material from the hopper to the conveying unit limits the supply of granular material from the hopper to the conveying unit to be substantially no greater than the maximum rate.

In a particular method, controlling a flow of granular material from the hopper to the conveying unit with a rotating first roll includes conveying granular material from the hopper to the conveying unit in at least one pocket portion formed in an outer periphery of the first rotating roll.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

DETAILED DESCRIPTION OF THE INVENTION

Figure 1:
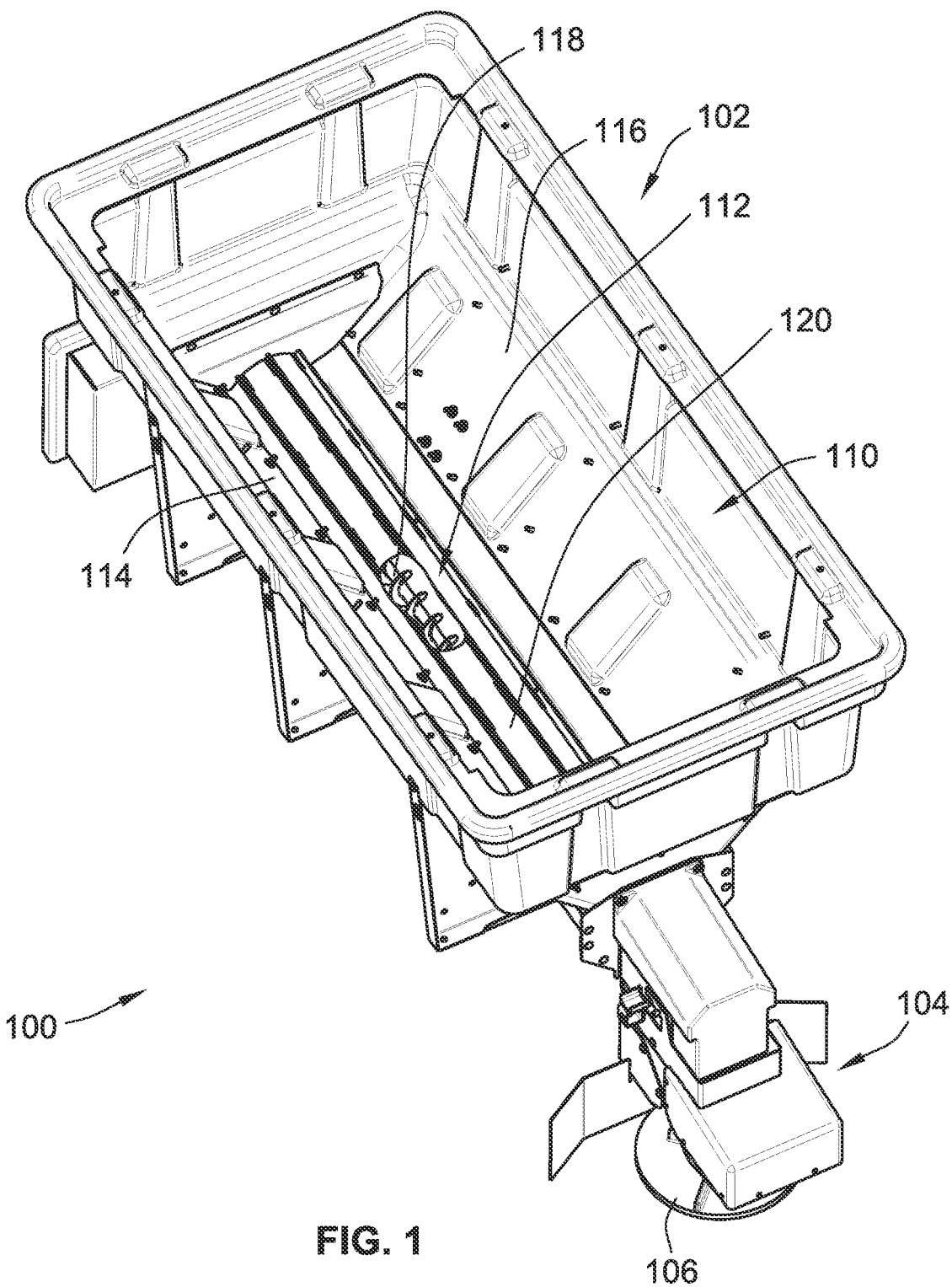
FIG. 1 is a top perspective illustration of a hopper spreader apparatus according to an embodiment.

FIG. 1 illustrates a hopper spreader apparatus 100 in accordance with an embodiment of the present invention. The hopper spreader apparatus is designed to distribute granular material including easily flowing material and flow resistant material such as, for example, sand (including dry and wetted sand), salt, salt with a liquid additive, or a mixture of sand and salt. While the hopper spreader apparatus 100 finds particular use in spreading sand and/or salt for cold weather applications, the hopper spreader apparatus 100 can be used for distributing other materials in other situations, such as for example, fertilizer.

The hopper spreader apparatus 100 generally includes a hopper 102 for storing the material to be distributed and a spreading unit 104 for spreading the material. In the illustrated embodiment, the spreading unit 104 is in the form of a spinner assembly that includes a rotating spinner 106 that spreads the material by centrifugally propelling the material that is supplied to the spinner 106.

The illustrated hopper spreader apparatus 100 is designed to be carried in the bed of a pick-up truck but other implementations of the one or more aspects of the invention could be incorporated into other hopper spreader apparatuses that are pull-behind type spreaders or are mounted directly to the chassis of a vehicle.

The hopper 102 defines a storage cavity 110 in which the material to be distributed is stored. The hopper 102 is generally designed to use gravity to flow material to a dispensing system 112 (only partially illustrated in FIG. 1) which transports the material from the hopper 102 to the spreading unit 104 and particularly the spinner 106.

The hopper 102 has tapered sides 114, 116 that assist in feeding the material toward the dispensing system 112. The sides will typically have an angle of approximately 40-45 degrees relative to horizontal.

Figure 2:
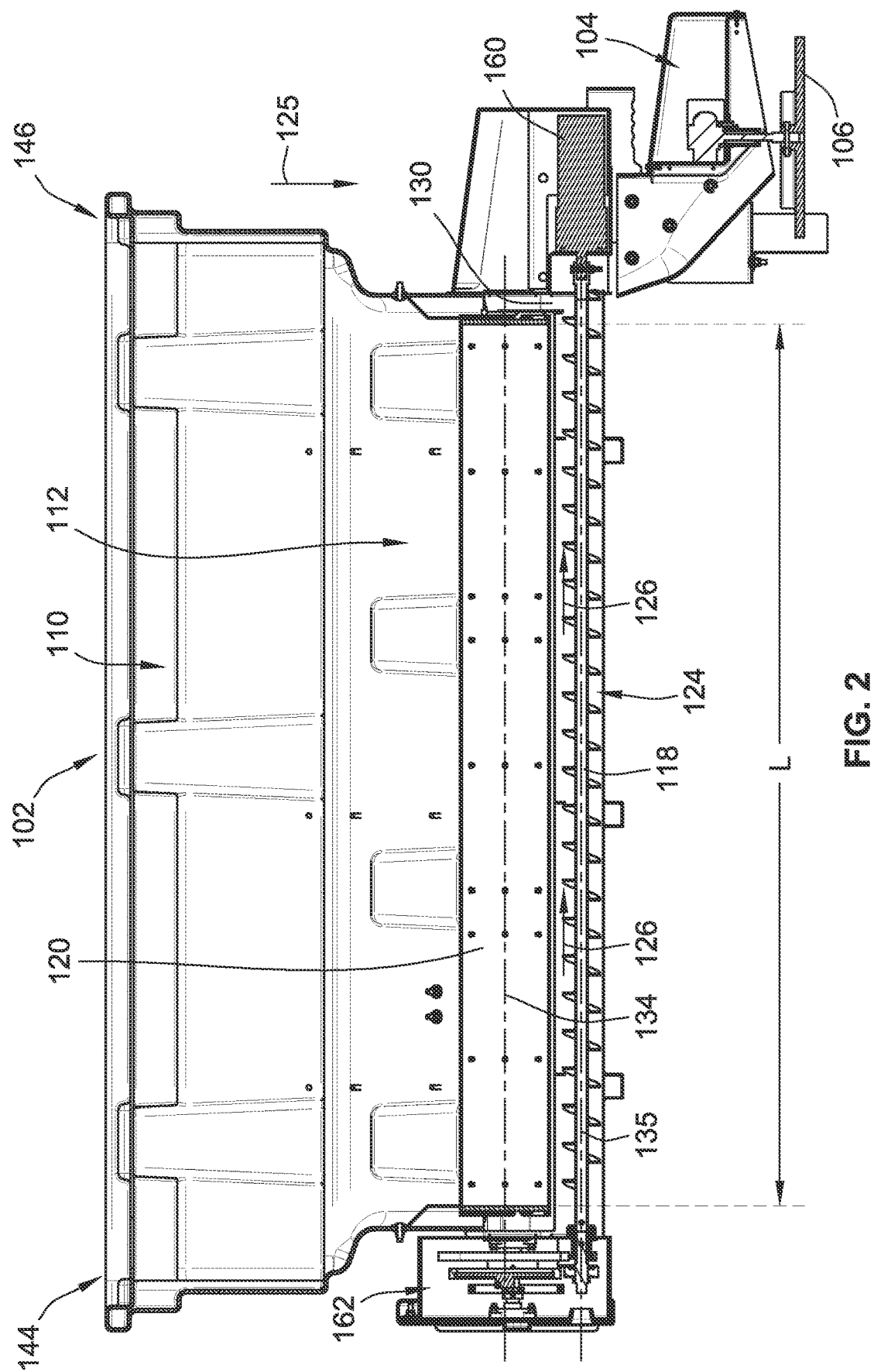
FIG. 2 is a partial side cross-sectional illustration of the hopper spreader apparatus of FIG. 1.
Figure 3:
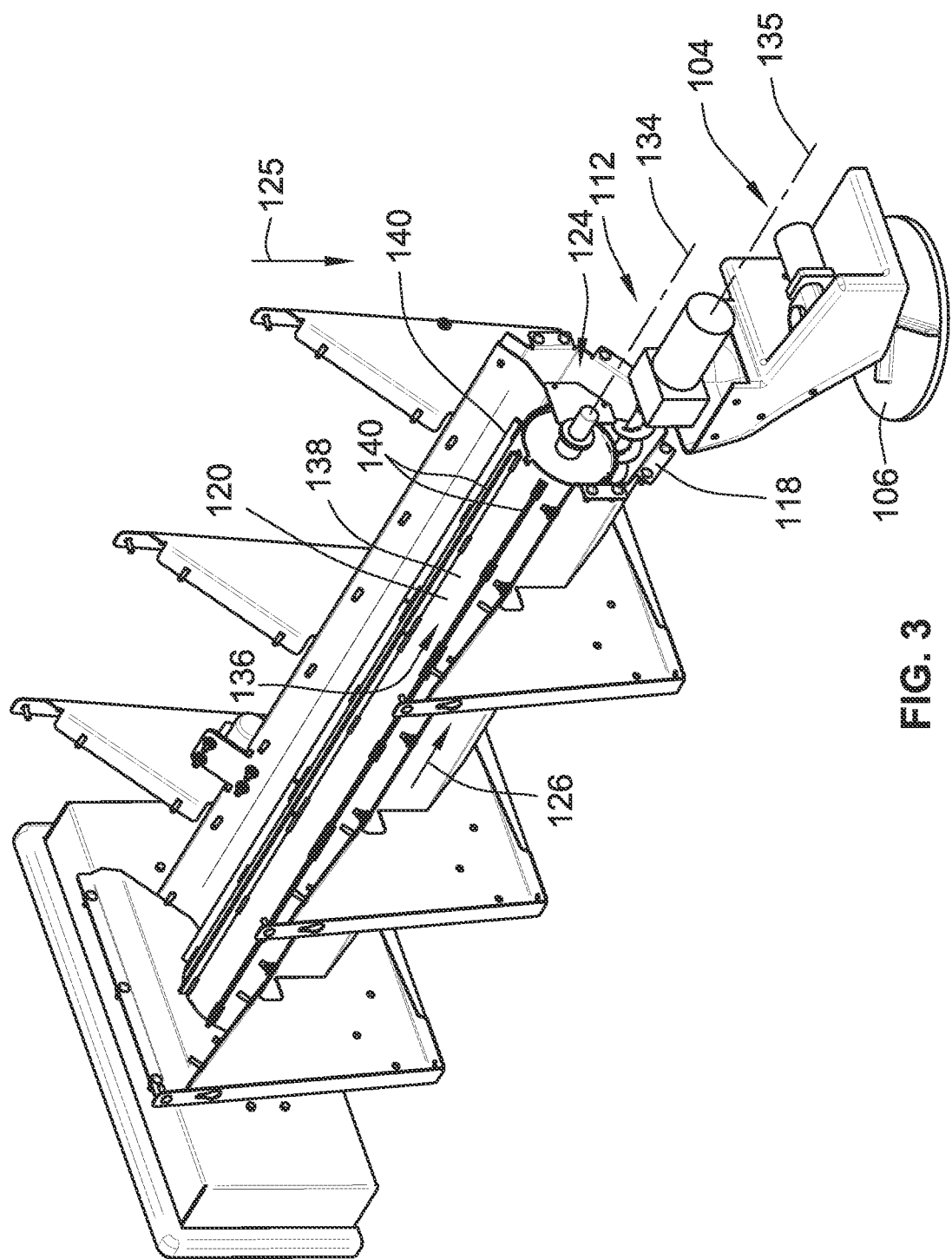
FIG. 3 is a partial top perspective illustration of the hopper spreader apparatus of FIG. 1 with the hopper and some safety covers removed for clarity and illustrative purposes.

With additional reference to FIGS. 2 and 3, the dispensing system 112 actively controls the supply of material to the spreading unit 104. The dispensing system 112 is preferably configured to be able to uniformly supply both high flow and low flow materials to the spreading unit 104.

The dispensing system 112 generally includes a conveying unit illustrated in the form of auger 118 that conveys material from the hopper 102 to the spreading unit 104. The dispensing system 112 also includes a rotating roll 120 that controls the flow of material from the hopper 102 to the auger 118.

Figure 22:
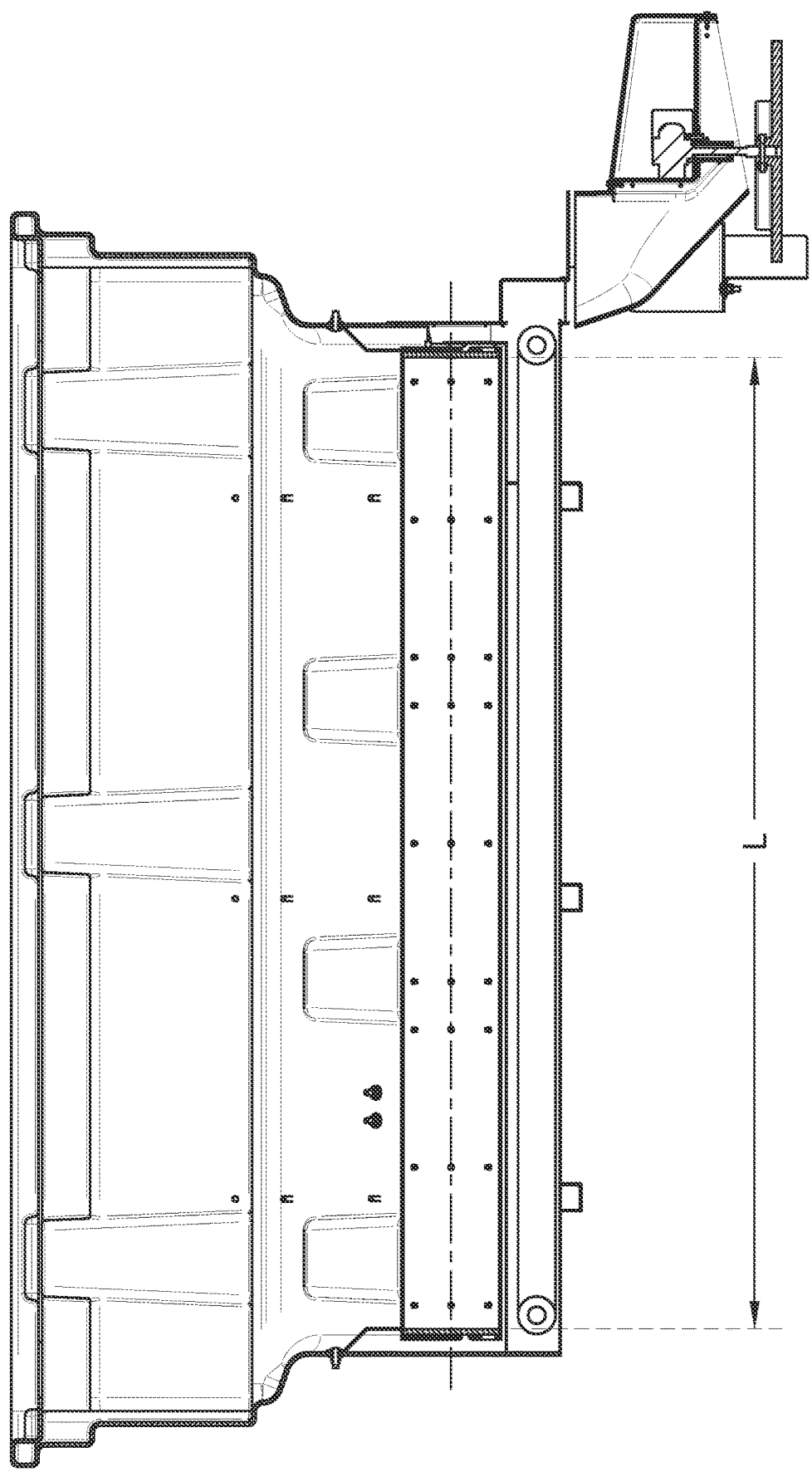
FIG. 22 illustrates an alternative embodiment in simplified form that includes the use of a conveyor rather than an auger While the invention will be described in connection with certain preferred embodiments, there is no intent to limit it to those embodiments. On the contrary, the intent is to cover all alternatives, modifications and equivalents as included within the spirit and scope of the invention as defined by the appended claims.

While illustrated as an auger 118, other embodiments of the conveying unit could utilize a conveyor or similar device such as, for example, a drag chain or a belt as illustrated in simplified form in FIG. 22. However, the use of an auger 118 is preferable to provide a more uniform spread pattern as the use of an auger provides a consistent supply of material to the spinner 106 rather than slumps of material as is well known. However, the use of a drag chain can still see the realization of some of the benefits of the instant invention. Further, by using the instant invention, it is contemplated that narrower drag chains or belts could be used and driven at higher speeds than typical which it is further contemplated that a more uniform spread pattern would result.

The auger 118 is located in a trough region 124 that is gravitationally below the storage cavity 110 of hopper 102 such that gravity (illustrated by arrow 125) is used, at least in part, to move material from the storage cavity 110 toward the auger 118. The auger 118 is configured to convey material that enters trough region 124 axially towards the spreading unit 104 as illustrated by arrow 126. The flow of material due to auger 118 is generally parallel to the rotational axis of the auger and generally orthogonal and typically almost perpendicular to gravity 125. The auger 118 and/or trough region 124 may be configured to have a slight downhill orientation directed towards an outlet end 130 of the trough region 124 such that the flow of material is not perfectly perpendicular to gravity. Typically, the angle will be between about 80 and 95 degrees relative to gravity and thus may be even slightly uphill.

Figure 4:
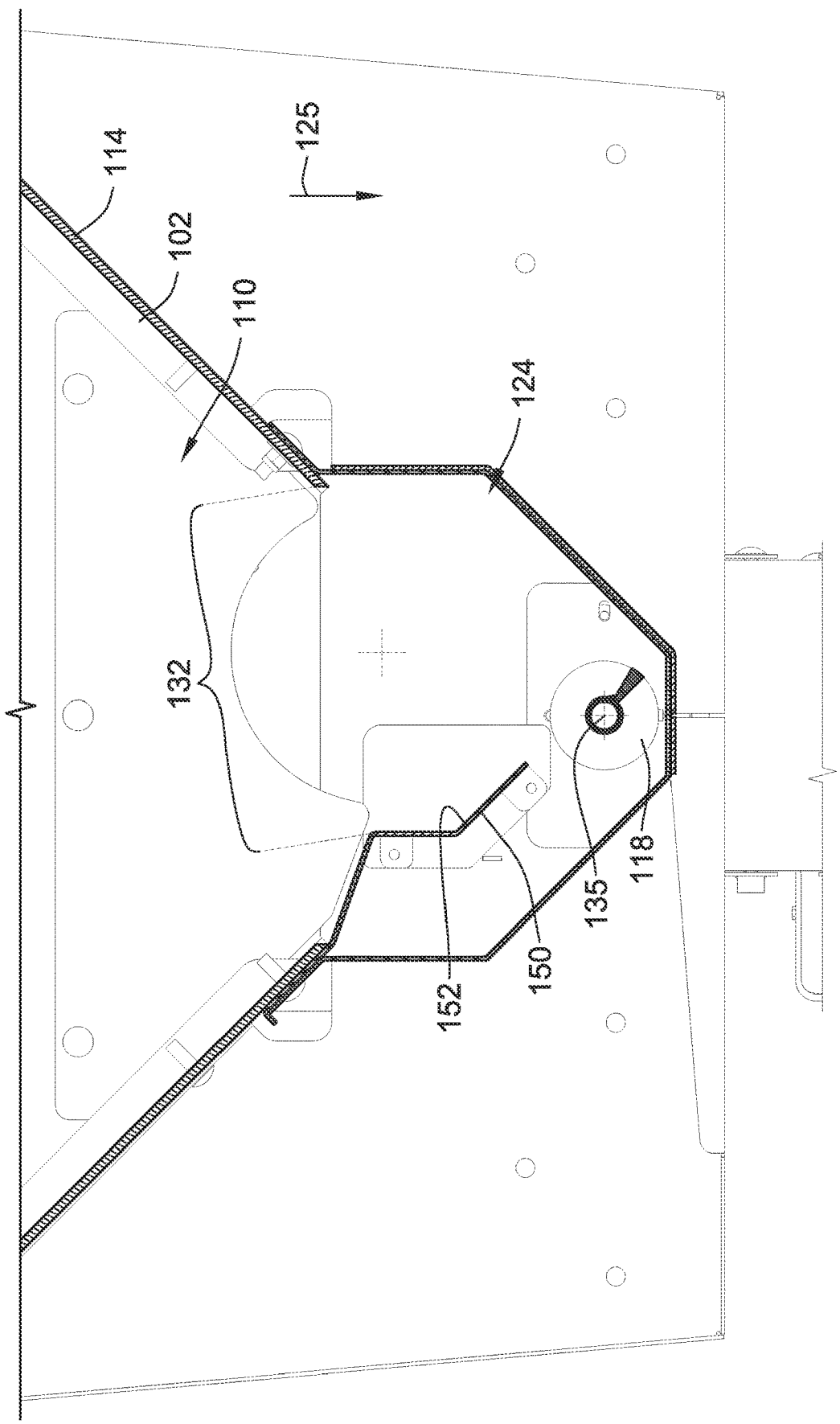
FIG. 4 is a partial cross-sectional illustration of the hopper spreader apparatus of FIG. 1 with the rotating roll removed.

With reference to FIG. 4, the trough region 124 has a mouth 132 that opens toward the storage cavity 110 and extends longitudinally along a bottom region of the hopper 102. For clarity, the rotating roll 120 is removed in FIG. 4 to better illustrate mouth 132. The material within the storage cavity 110 flows from the storage cavity 110 through the mouth 132 and into the trough region 124 prior to being conveyed by the auger 118 to spreading unit 104. The sidewalls of the hopper 102 proximate the bottom are tapered and direct the flow of material towards the mouth 132.

Figure 5:
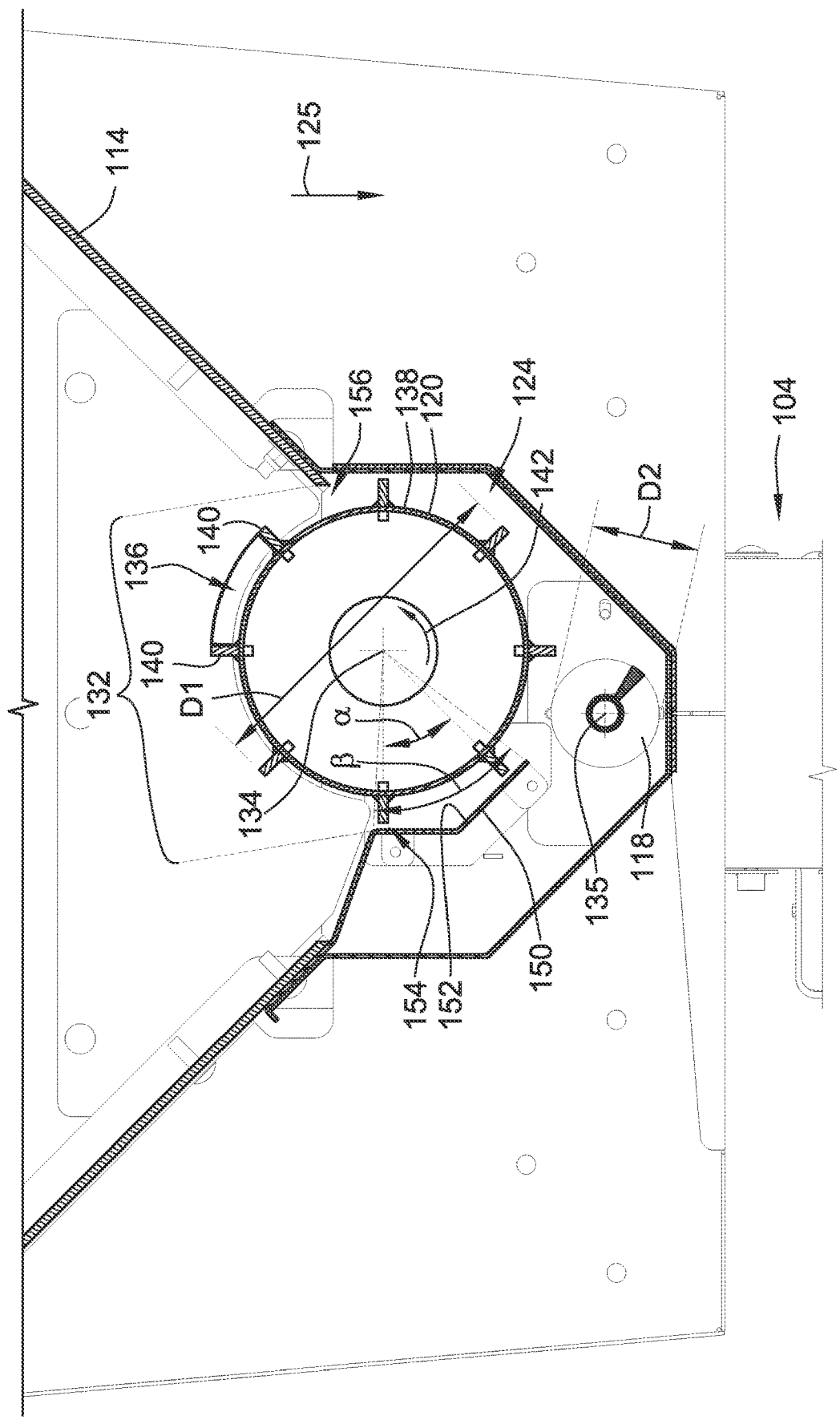
FIG. 5 is similar to FIG. 4 with the rotating roll inserted proximate the mouth of the trough region.

FIG. 5 includes rotating roll 120. The rotating roll 120 is positioned adjacent to the mouth 132. In this embodiment, the rotating roll 120 is positioned within mouth 132 such that a portion is positioned gravitationally above the mouth 132 and generally within storage cavity 110 while another portion is positioned below the mouth 132 and generally within trough region 124. In this embodiment, the rotating roll 120 is positioned gravitationally above the auger 118.

The position of the rotating roll 120 limits the flow of material from the storage cavity 110 into the trough region 124. Further, with the rotating roll 120 gravitationally above and over auger 118, the weight of the material within storage cavity 110 above the auger 118 is not applied to the auger 118 or is at least more limited. This prevents the material from overloading and jamming auger 118.

As the rotating roll 120 rotates about roll rotational axis 134, material is transferred from the storage cavity 110 to trough region 124 where the material can be conveyed by auger 118 toward outlet end 130 and ultimately to spreading unit 104. The auger rotates about auger rotational axis 135. In the illustrated embodiment axis 134 and axis 135 are generally parallel to one another.

The outer periphery of the rotating roll 120 defines a plurality of pocket portions 136 that are used to carry a predetermined amount of material from the storage cavity 110 to the trough region 124. In the illustrated embodiment, the rotating roll 120 includes a roll body 138 and plurality of pieces of flighting 140 that extends axially along the roll body 138 generally parallel to rotational axis 134 (also referred to as "flighting 140") to define the pocket portions 136.

The roll body 138 is generally tubular.

The flighting 140 extends radially outward and are evenly angularly spaced apart about the rotational axis 134 to form the pocket portions 136 therebetween. With reference to FIGS. 3 and 5, in the illustrated embodiment, the flighting 140 is provided by substantially planar flanges extending radially outward from the roll body 138. The flighting is substantially axially extending in the illustrated embodiment and does not extend angularly about the rotational axis 134. The flighting 140 may be welded to the roll body 138 or otherwise attached such as using bolts. The flighting 140 could be formed from plastic, rubber, metal depending on the application and particular wear characteristics necessary.

As the rotating roll 120 rotates, illustrated by arrow 142 in FIG. 5, material will fill pockets 136 and be transported into trough region 124. The volume of the pockets 136 and rate of rotation of rotating roll 120 will substantially determine the rate at which material is conveyed from the storage cavity 110 of the hopper 102 into the trough region 124.

Thus, the rate at which material enters into the trough region 124 can be controlled by the configuration and operation of the rotating roll 120. More particularly, if it is desired to change the flow of material into the trough region 124, the rotational speed of the rotating roll 120 can be varied.

Another benefit of the use of the rotating roll 120 is that the flighting 140 acts to shear off a bottom portion of the material within the storage cavity 110 much like a drag chain. Thus, the rotating roll 120 allows the hopper spreader apparatus 100 to easily handle flow resistant material such as wetted sand. It then substantially evenly dispenses the material onto the auger 118.

Further, unlike a drag chain or auger system of the prior art, the rotating roll 120 will grab a portion of the material stored in the hopper 102 along the entire length of the rotating roll 120. Thus, material is dispensed from the hopper 102 in a more uniform manner between the front 144 and rear 146 of the hopper 102. As noted above, prior art designs typically dispensed the material from the front of the hopper before the rear of the hopper such that a shift in the weight distribution of the hopper occurred as material is dispensed from the hopper spreader apparatus.

In some embodiments, the combined rate at which material is dispensed from the hopper 102 into the trough region 124 is substantially equal to or less than the rate at which material is evacuated by the auger 118. The amount of material within the trough region 124 will increase almost linearly from the front 144 toward the rear 146 of the hopper 102. This is different than standard prior art where the auger or drag chain will typically fill from the front of the hopper first and then once the front of the hopper is empty, it will progressively fill towards the rear of the hopper. In the present invention, by using the rotating roll 120 to dispense material into the trough region 124, material from within the storage cavity along the entire length of the rotating roll 120 will fill the trough region 124. Further, the auger 118 will, if the rotating roll 120 is configured correctly, not be filled with material until proximate the rear of the hopper 102. Thus, it is preferred that the rate at which material is dispensed into the trough region 124 by the rotating roll 120 at a same rate as the material is dispensed from the auger 118 toward the spreading unit.

If the rotating roll 120 dispenses material at too large of a rate relative to the rate of material being dispensed from the trough region 124 by auger 118, it could cause jamming of the auger 118 or material will once again empty from the front of the hopper 102 prior to emptying uniformly or from the rear. As such, it is preferred that the rate at which the rotating roll 120 transfers material to the trough region 124 is less than 10% greater than the rate at which material is dispensed from the trough region 124 by auger 118.

To control the rate at which material is dispensed into the trough region, the outer periphery of the rotating roll 120, and particularly the flighting 140 in this embodiment, is sized and positioned relative to mouth 132 and the trough region 124 to substantially inhibit the free flow of material around the rotating roll 120 and into trough region 124. This is configuration assists in preventing free flowing material such as dry salt from flowing directly into the trough region 124 and overloading the auger 118 or alternatively over flowing the trough region 124 and spilling out of the trough region through the outlet from which material is dispensed by auger 118 toward spinner 106.

The positioning of the rotating roll 120 is such that the weight of the material generally stored within storage cavity 110 is not directly or completely applied to auger 118. As such, a smaller higher speed auger can be used contrary to the larger diameter slower speed augers of prior art designs configured to attempt to handle the flow resistant materials. As such, a more consistent flow of material can be supplied to the spreading unit 104 from the dispensing system 112 independent of the type of material being dispensed.

To assist in preventing the free flow of material into the trough region 124, a roll mating region in the form of sealing baffle 150 is provided. The sealing baffle 150 defines a sealing face 152 that operably cooperates with the outer periphery of the of the rotating roll 120 and particularly the distal ends of flighting 140 in the illustrated embodiment. The spacing between the flighting 140 and the sealing face 152 of sealing baffle 150 is configured to inhibit and preferably substantially completely prevent the free flow of material into the trough region 124. For instance, when the rotating roll 120 is stationary, substantially no material is allowed to free flow between the rotating roll 120 and sealing baffle 150 into the trough region 124. It is desirable that no more than 15% of the material that flows into the trough region 124 from the hopper free flows into the trough region 124 rather than is carried into the trough region by the pocket portions 136. More particularly, the rate at which material is transferred from the storage cavity 110 into the trough region is no more than 15% the rate at which material can be transported into the trough region 124 based on the rate at which the rotating roll 120 rotates in combination with the volume of the pocket portions. More preferably, less than 10% of the material that flows into the trough region 124 from the hopper 102 into the trough region 124 free flows rather than being carried into the trough region by the pocket portions 136.

Further, the angular extent β of the sealing face 152 about rotational axis 134 of the roll is at least 75 percent the angular extent α of a pocket portion 136, e.g. between adjacent pieces of flighting 140. More preferably, angular extent β is at least equal to or greater than angular extent α. In the preferred configuration, one of the pieces of flighting 140 is always located within the angular extent β of the sealing baffle 150 so as to act as an inhibitor of the free flow of material from the storage cavity 110 to the trough region 124.

A clearance gap 154 is formed on an inlet side of mouth 132 and similar clearance gap 156 is formed on an outlet side of mouth 132. The pocket portions 136 enter the trough region 124 through the inlet side of the mouth and exit the trough region 124 through the outlet side as the rotating roll 120 rotates during normal operation. Sealing baffle 150 described above is proximate the inlet side of the mouth 132.

A clearance gap 154 between the portion of the hopper defining the mouth 132 and the outer periphery of the rotating roll 120 is preferably sized such that no more than 15% of the flow of material into the trough region 124 is free flow as discussed above and more preferably no more than 10% of the flow of material into the trough region 124 is free flow.

Figure 6:
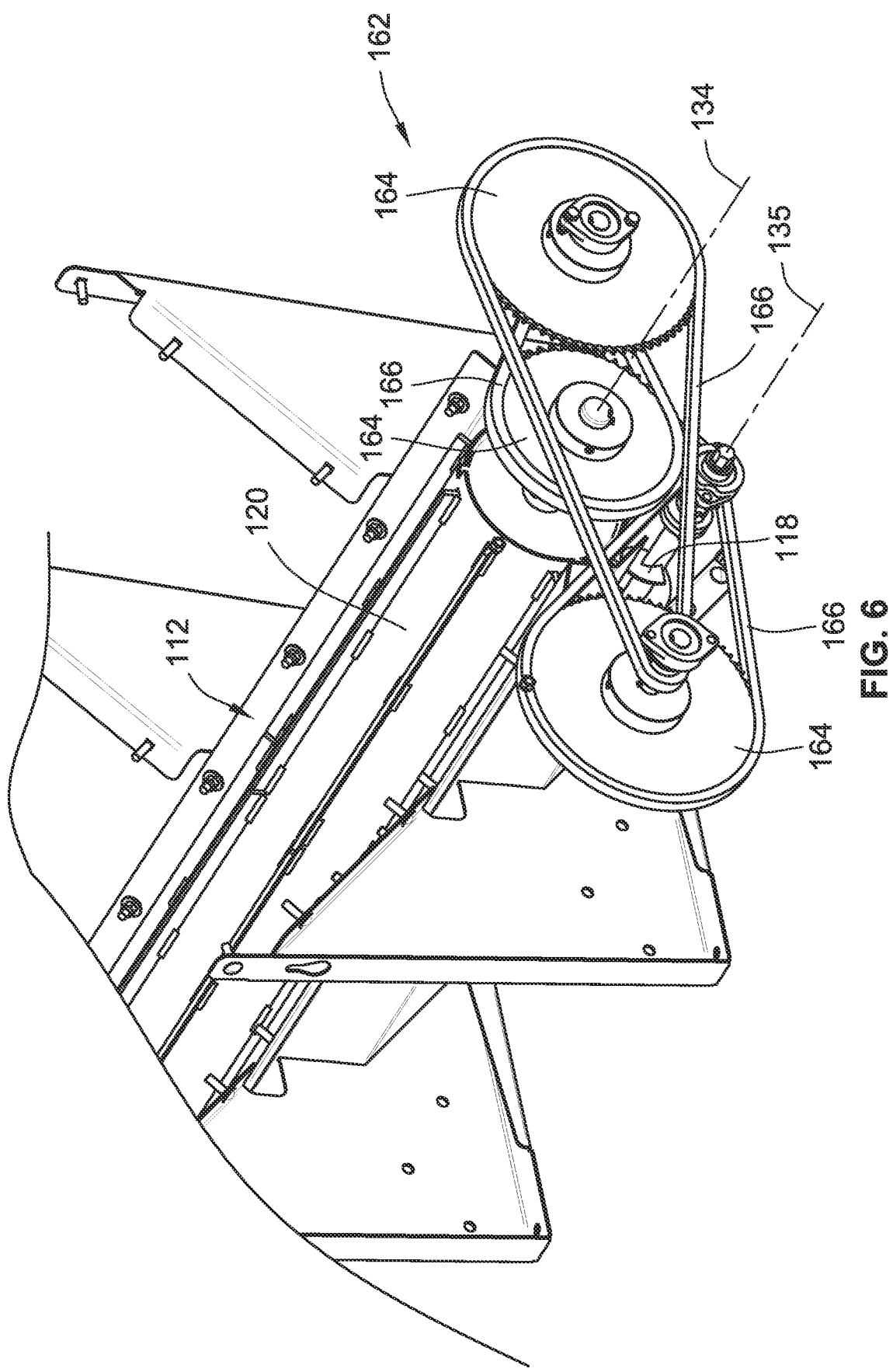
FIG. 6 is a simplified illustration of a transmission coupling the auger with the rotating roll with the hopper removed for clarity.
Figure 7:
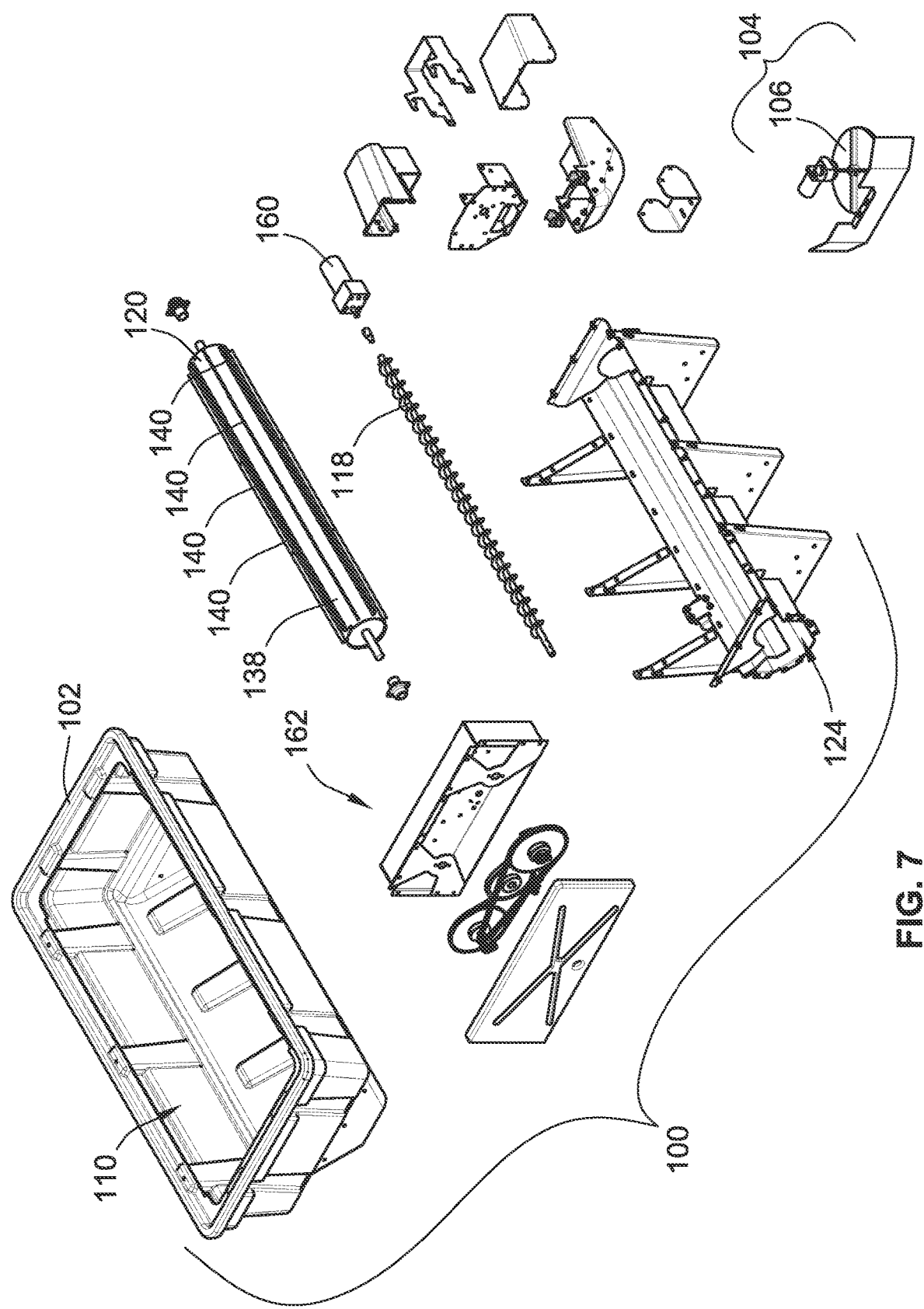
FIG. 7 is a partial exploded illustration of the hopper spreader apparatus of FIG. 1.

With reference to FIGS. 2 and 6, the dispensing system 112 includes a drive motor 160 configured to drive auger 118 about axis 135. The drive motor 160 is directly connected to a first end of the auger 118. In the illustrated embodiment, a transmission 162 is coupled to an opposite end of auger 118 as well as to an end of the rotating roll 120 such that drive motor 160 also drives rotating roll 120 about axis 134.

The transmission includes a plurality of sprockets 164 and chains 166 to couple rotationally the auger 118 to the rotating roll 120. Due to the relative size and direction of material transfer, the rotating roll 120 is driven at a slower rate than auger 118. As such, the sprockets 164 and chains 166 have a reducing gear ratio. It is contemplated that the gear ratio could be manipulated to change the relative rate of rotation of the auger 118 and rotating roll 120 depending on the product being dispensed or for a desired spreading rate.

The speed of the drive motor 160 can be altered to adjust the spreading rate. The drive motor 160 can be reversed in the event of a jam in the system.

While drive motor 160 is configured to operably drive both auger 118 and rotating roll 120, other embodiments could have separate drive motors for driving the auger 118 and the rotating roll 120 independently. Also, the sprockets 164 and chains 166 could be replaced with belts and pulleys or gears. Further yet, the transmission, if used, could be located as the same end as the drive motor 160.

So that the rotating roll 120 can be driven at a slower rate, the diameter D1 of the rotating roll 120 is greater than the diameter D2 of auger 118. Preferably, diameter D1 is at least twice as great as diameter D2.

To facilitate additional flow of the material from the hopper 102, some embodiments may include a vibrator externally attached to the hopper 102.

In some embodiments, the rotating roll 120 can be translated axially parallel to the rotational axis 134. Alternatively, the rotating roll 120 could be translated in directions skewed to the rotational axis 134, such as vertically or sideways. The motion of the rotating roll 120 can facilitate improved breakup of material such as low flow material and cause increased collapse of the material.

The roll 120 could be rotated and/or linearly translated using periodic or cyclic motion. Various systems could be used for rotationally or linearly driving the roll such as electric, hydraulic, pneumatic, piezoelectric, eccentrically, slider crank systems etc.

Figure 8:
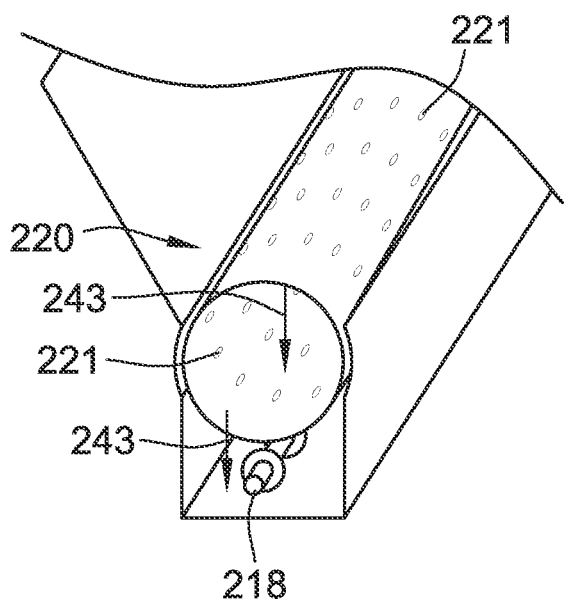
FIG. 8 is a simplified illustration of an alternative embodiment of a rotating roll for use in a hopper spreader apparatus that uses holes to regulate the flow of material into the trough region.

FIG. 8 is a schematic illustration of an alternative embodiment of a rotating roll 220. In this embodiment, the rotating roll 220 has a tubular roll body 238 that is perforated and includes a plurality of holes 221. The holes 221 may be arranged in a uniform or non-uniform manner. The holes 221 allow material to flow radially through the outer periphery of the roll body 238. The holes 221 could be elongated in the form of slots. As the rotating roll 220 rotates material is sheared from the bottom of the material stored in the hopper and falls through the holes 221 located at a top of the rotating roll 220 into the interior of the roll body 238 and then radially out of the roll bod 238 through holes 221 located in the bottom of the roll body 238 as illustrated by arrows 243. It should be understood that because the rotating roll 220 rotates, the holes 221 identified as being in the top will rotate to being in the bottom over time and the same as to the holes that are located in the bottom will eventually transition towards being holes within the top.

Figure 9:
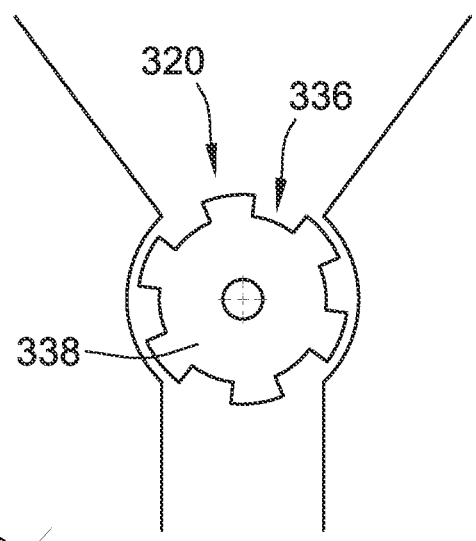
FIG. 9 is a simplified illustration of an alternative embodiment of a rotating roll for use in a hopper spreader apparatus.

FIG. 9 is a schematic illustration of an alternative embodiment of a rotating roll 320. In this embodiment, the rotating roll 320 has pocket portions 336 that are formed directly in the outer periphery of the roll body 338. This rotating roll 320 is similar to rotating roll 120 except in the way that the pocket portions 336 are provided.

Figure 10:
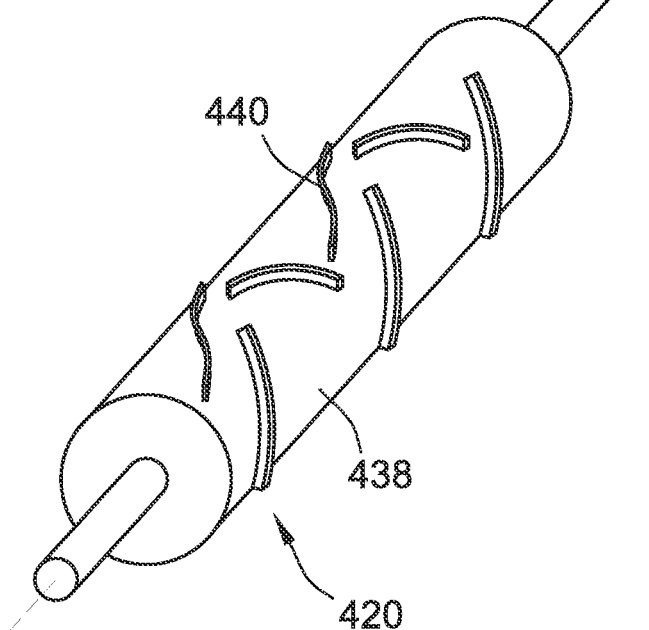
FIG. 10 is a simplified illustration of an alternative embodiment of a rotating roll for use in a hopper spreader apparatus that utilizes non-parallel/non-planar flighting.

FIG. 10 is a schematic illustration of an alternative embodiment of a rotating roll 420. In this embodiment, the flighting 440 is attached to the roll body 438 in a helical pattern such that the flighting extends angularly about the axis of rotation 434 as well as axially along the axis of rotation 434. Further, axially adjacent flighting 440 extends angularly in opposite directions such that some extends in a clockwise manner while other flighting 440 extends in a counterclockwise manner.

Figure 11:
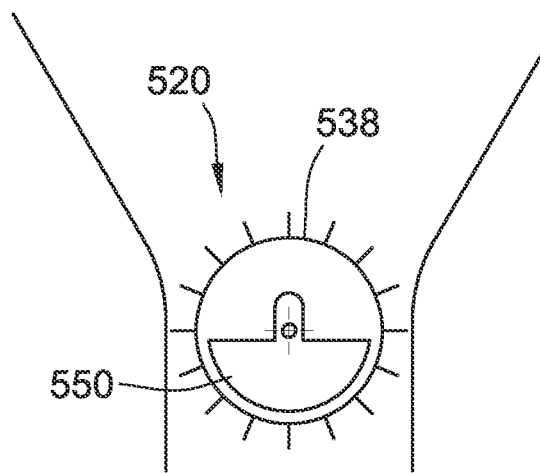
FIG. 11 is a simplified illustration of an alternative embodiment of a rotating roll for use in a hopper spreader apparatus.

FIG. 11 is a schematic illustration of an alternative embodiment of a rotating roll 520. The rotating roll 520 is similar to roll 120. However, in this embodiment, the rotating roll 520 provides a hammer effect. The hammer effect is provided by having a weight imbalance. The weight imbalance can be provided by an offset weight 550 located within an internal cavity of roll body 538 of the rotating roll 520.

Figure 12:
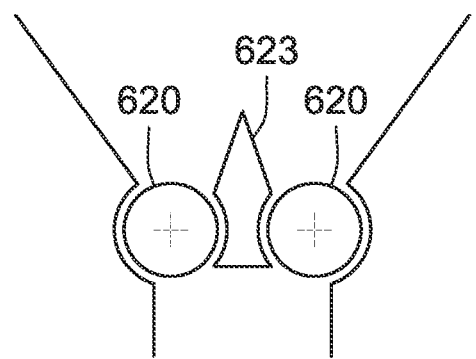
FIG. 12 is a simplified illustration of an alternative embodiment that utilizes a pair of rotating rolls for use in a hopper spreader apparatus to limit the flow of material to the dispensing system.

FIG. 12 is a schematic illustration of an alternative embodiment. In this embodiment, a pair of rotating rolls 620 are provided. In the illustrated embodiment, the rotating rolls 620 rotating about axis of rotations that are parallel to one another. A divider 623 is positioned between the pair of rotating rolls 620. The rolls 620 may counter rotate or rotate in the same direction. The rolls 620 may rotate at the same speed or different speeds. The speeds of the rolls 620 can be independently controlled or coupled together. While not illustrated, in some embodiments, the rolls may be at non-parallel orientations to one another.

Figure 13:
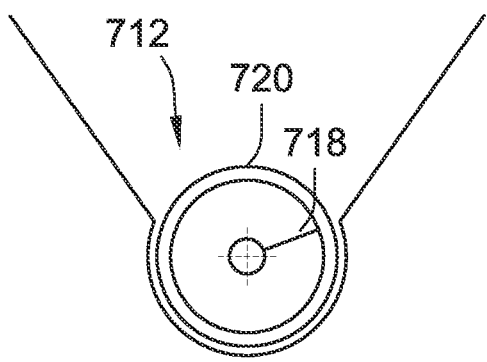
FIG. 13 is a simplified illustration of an alternative embodiment of a rotating roll for use in a hopper spreader apparatus that has an auger positioned internal to the rotating roll with the roll and auger being concentric.
Figure 14:
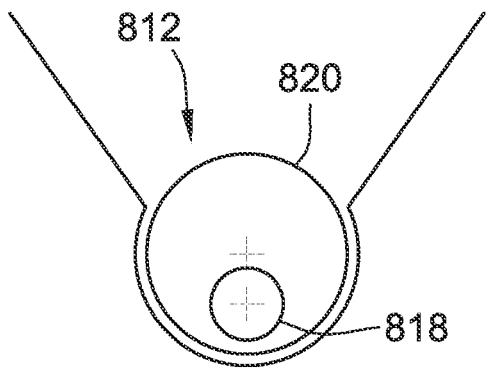
FIG. 14 is a simplified illustration of an alternative embodiment of a rotating roll for use in a hopper spreader apparatus that has an auger positioned internal to the rotating roll with the roll and auger being radially offset from one another.

FIG. 8 illustrated a rotating roll 220 that included holes 221. In that embodiment, the auger 218 was located gravitationally below the rotating roll 220. FIGS. 13 and 14 illustrate embodiments of dispensing systems 712 and 812 where the auger 718, 818 is located within the rotating roll 720, 820. In these embodiments, the outer periphery of the rotating roll 720, 820 would have holes to allow material to flow radially therethrough. The auger 718, 818 transports the material axially within the rotating rolls 720, 820. The auger 718, 818 will draw the material out of the center of the rotating roll 718, 818 as it is transported to the spreading unit.

These units provide for a more compact and low profile design.

In FIG. 13, the auger 718 and the rotating roll 720 are co-axial such that the rotational axes of the components align. In this embodiment, the rotating roll 720 and the auger 718 could share a central shaft and rotate at a same speed or be independently drivable and rotate at different speeds. In FIG. 14, the auger 818 and the rotating roll 820 are radially offset from one another such that the rotational axes of the components are offset.

In these embodiments, the bottom portion of the rotating roll 720, 820 could be closed to prevent material flow therethrough.

In another embodiment, a pair of rotating concentric rolls could be provided. The outside roll acts as a shear to shear a bottom portion of the material stored within the hopper. The internal roll could, for example, be in the form of a screen. The internal roll could prevent larger materials from passing through. Thus, the inner roll could act as a variable screed.

Further, the double roll arrangement could be used to enhance flow and make flow resistive materials easier to flow by breaking up the material into smaller elements by shearing the material between the two drum faces.

In such an arrangement, the inner and outer rolls could be counter rotating or rotate at different speeds in the same direction.

Figure 15:
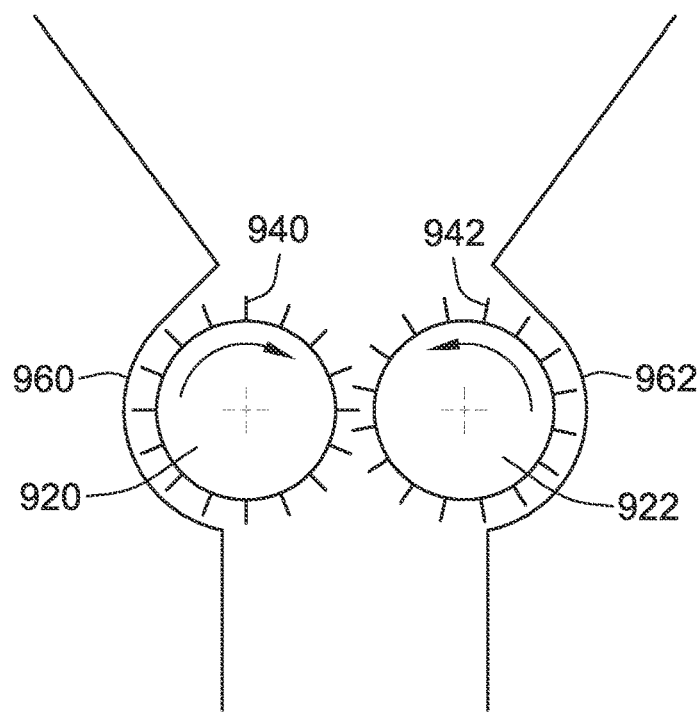
FIG. 15 is a simplified illustration of an alternative embodiment that utilizes a pair of rotating rolls for use in a hopper spreader apparatus to limit the flow of material to the dispensing system.

FIG. 15 illustrates a further embodiment that utilizes two counter rotating rolls 920, 922. The rotating rolls 920, 922 have flighting 940, 942. The flights 940, 942 intersect and draw the material between them or in alternative embodiments the direction of rotation could be reversed and the material is drawn to the sides between the rotating rolls 920, 922 and the sides 960, 962 of the hopper and/or trough region.

Figure 16:
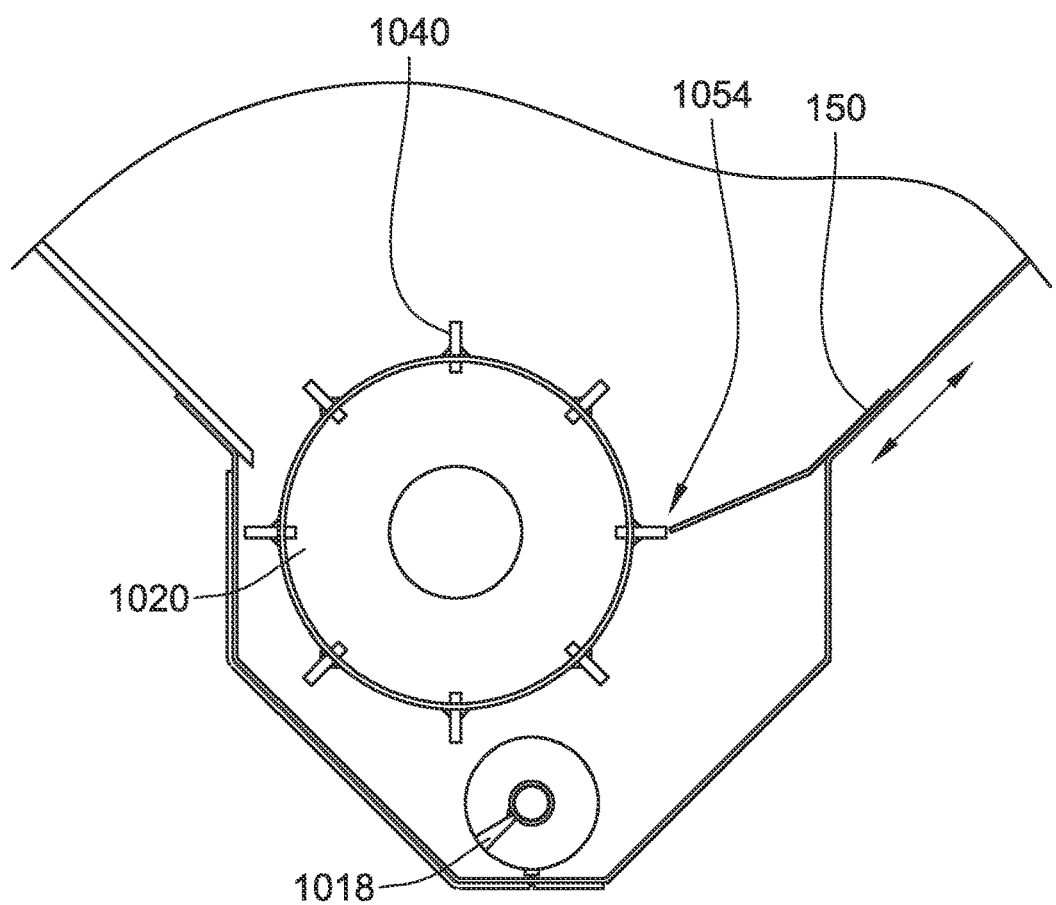
FIG. 16 is a simplified illustration of an alternative embodiment that utilizes an adjustable sealing baffle to adjust the flow of material into the trough region.

FIG. 16 illustrates a further embodiment. In this embodiment, an adjustable baffle 1050 is provided to allow for adjustment of the size of gap 1054 formed between flights 1040 and the distal end of baffle 1050. This allows a user to adjust the gap and permit free flow of material if desired. Further, the gap 1054 can be increased when flowing course material such as pebbles or larger rock without causing damage to the system. The positon of baffle 1050 could be internally or externally adjustable depending on the system and material to be dispensed.

Figure 17:
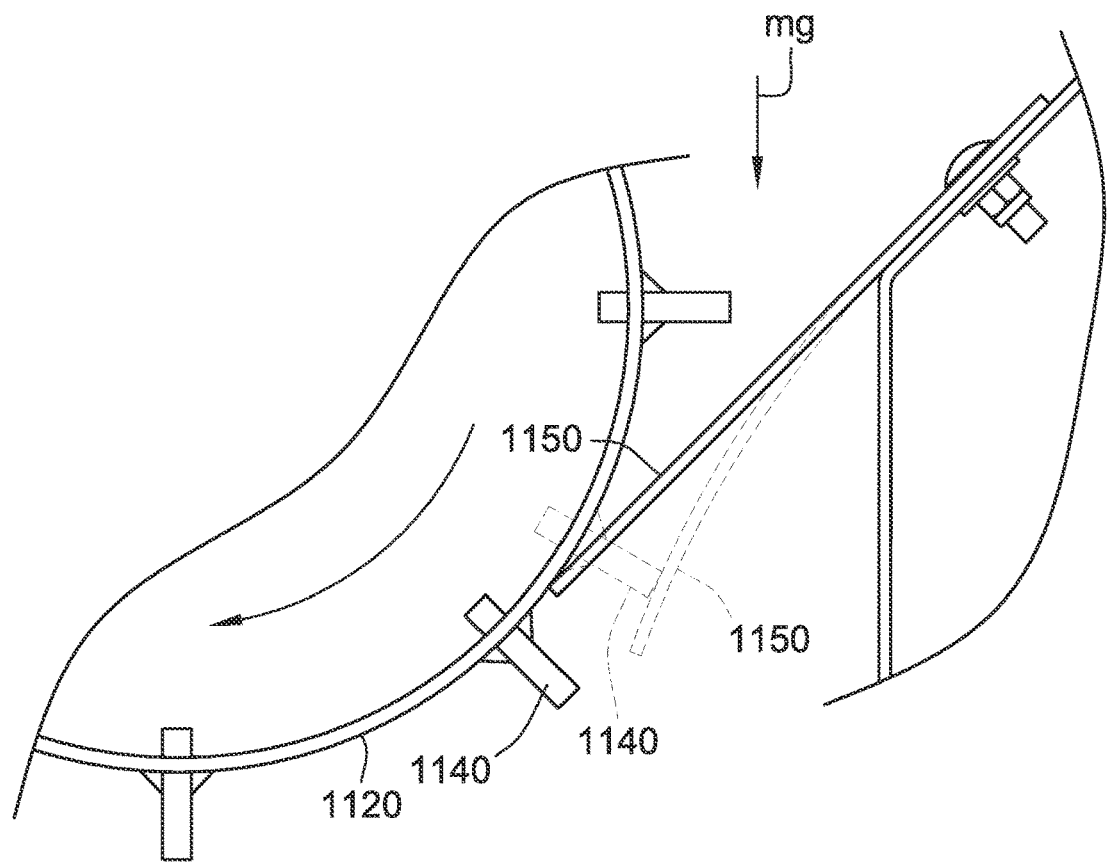
FIGS. 17-20 are simplified illustrations of an alternative embodiments that utilize flexible sealing baffles that ride on the outer surface of the rotating roll.

FIG. 17 illustrates a further embodiment where a baffle 1150 is biased against the face of rotating roll 1120. The baffle 1150 rubs against the face of the rotating roll 1120 and acts as a seal preventing material from passing through. The flights 1140 will bias the baffle 1150 outward away from the rotational axis of roll 1120 as the rotating roll 1120 rotates. In this configuration, only the material captured by the flight 1140 will be allowed to pass by baffle 1150 and into the adjacent trough region.

Figure 18:
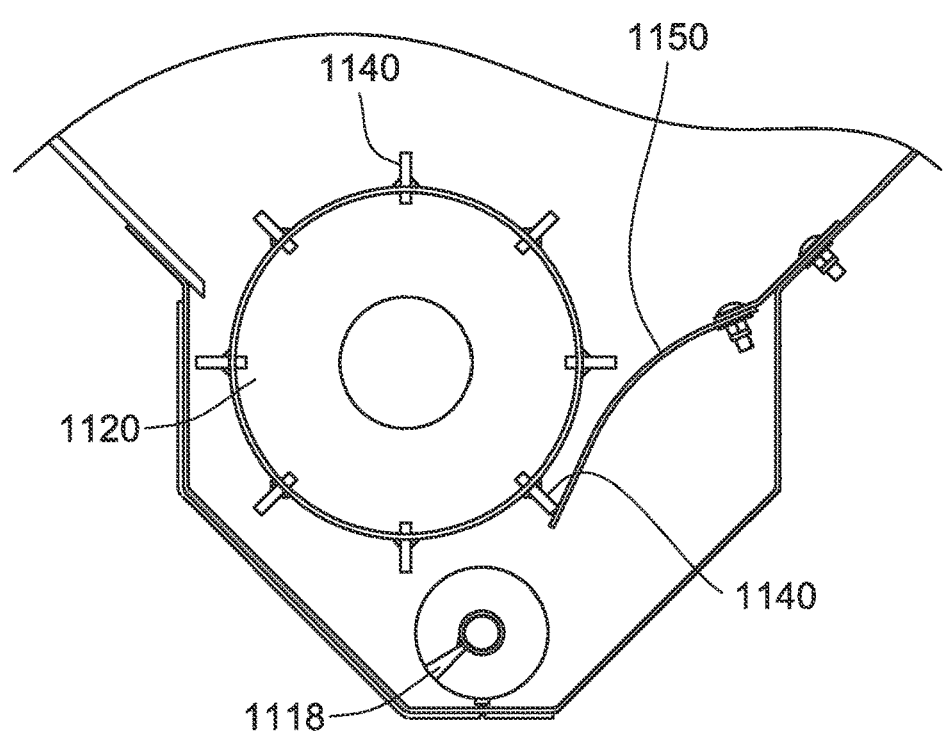

FIG. 18 is similar to FIG. 18 and illustrates baffle 1150 rubbing against the rotating roll 1120.

Figure 19:
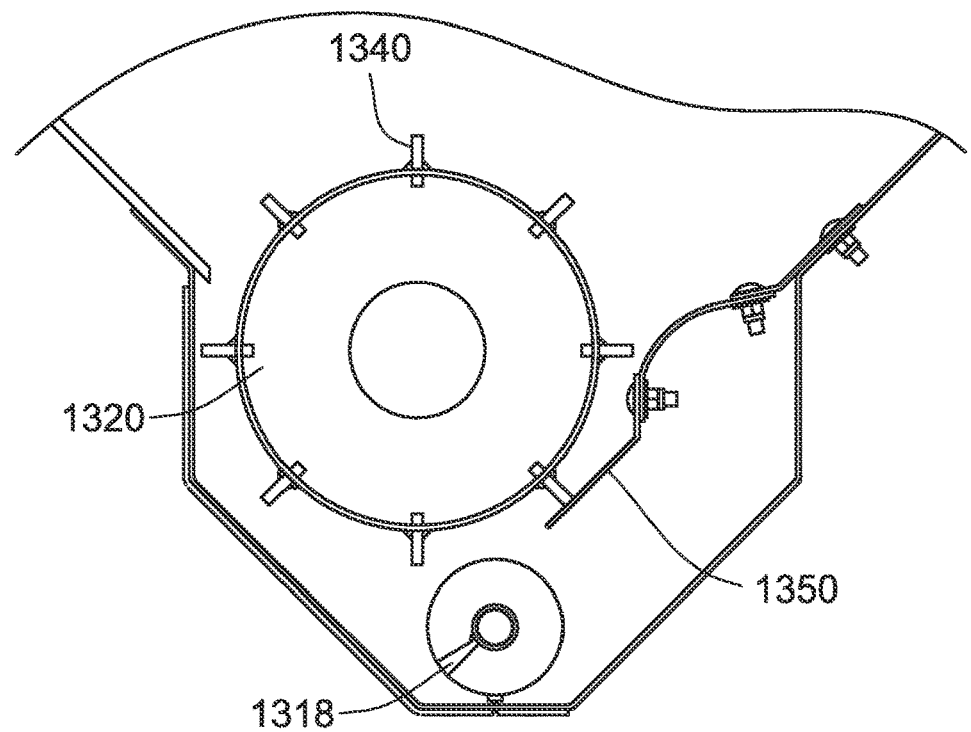

FIG. 19 is an alternative embodiment. In this embodiment, the baffle is a combination of components including baffle member 1350 and biasing member 1351 which biases the baffle member 1350 towards rotating roll 1320. The biasing member 1351 in this embodiment is bent in a curved manner.

Figure 20:
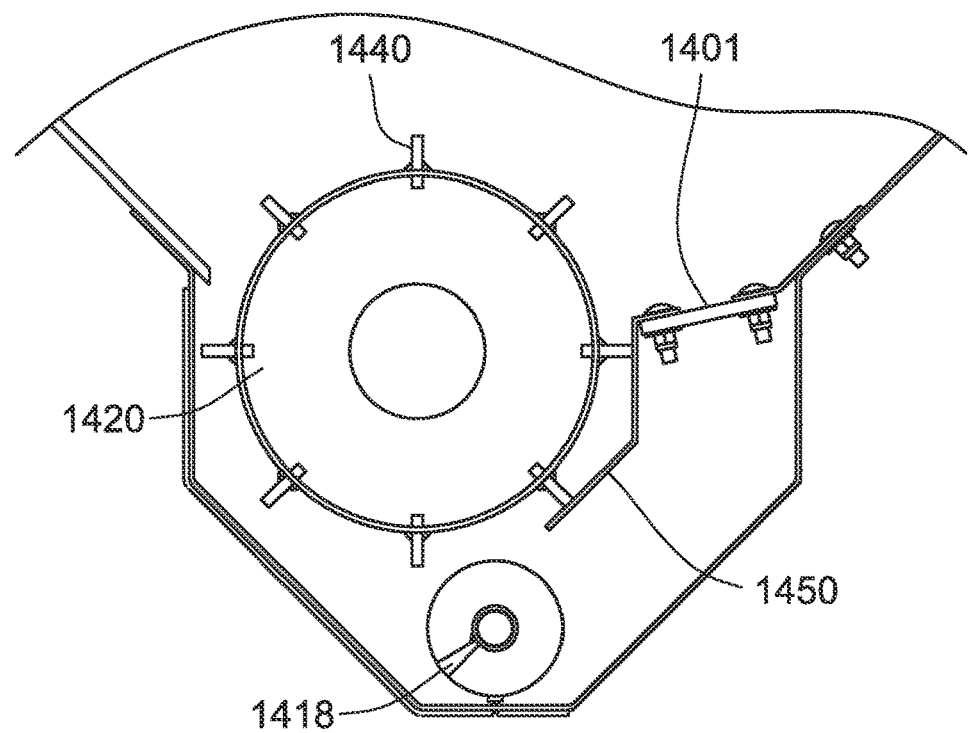

FIG. 20 is similar to FIG. 19 in that the baffle is a combination of components including a generally planar flexible member 1451 connecting and supporting baffle 1450.

Figure 21:
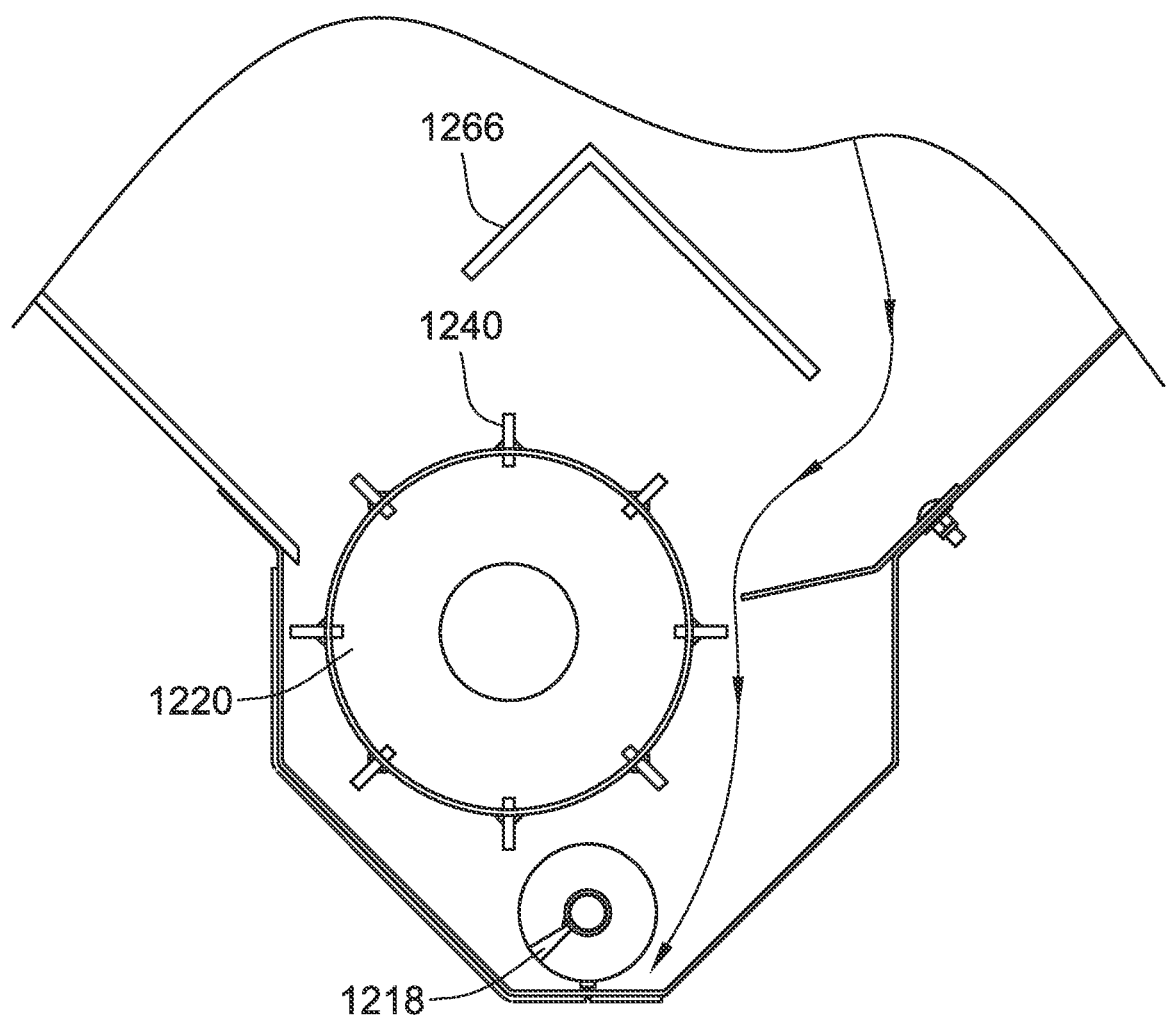
FIG. 21 is an alternative embodiment that includes an inverted-V arrangement to further control the flow of material into the trough region.

FIG. 21 illustrates an embodiment that also includes a secondary baffle 1166 positioned vertically above the rotating roll 1220 and auger 1218.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A hopper spreader apparatus for spreading free flowing granular material comprising:
    a hopper having a storage cavity for storing the free flowing granular material to be spread;

a spreading unit for spreading the free flowing granular material;

a dispensing system positioned to transport free flowing granular material from the hopper to the spreading unit, the dispensing system including:

a conveying unit for conveying the free flowing granular material toward the spreading unit, the conveying unit including an auger that rotates about an auger axis of rotation, the auger having a first outer diameter that provides a first width that is perpendicular to gravit and the auger axis of rotation, the conveying unit being located within a trough region defining a mouth, the mouth opening towards the storage cavity of the hopper, the free flowing granular material within the hopper entering into the trough region through the mouth; and a rotating first roll limiting a free flow of the free flowing granular material from the hopper to the conveying unit, the first roll being positioned within the mouth such that a portion of the first roll is positioned within the storage cavity above the mouth and a portion of the first roll is positioned at least partially within the trough region such that the first roll restricts the free flow of free flowing granular material from the hopper into the trough region through the mouth, the first roll having a cylindrical roll body defining a second outer diameter that is greater than the first outer diameter, the cylindrical roll body rotatable about a first roll axis of rotation, the first roll having a second width that is perpendicular to the first roll axis of rotation and perpendicular to gravity;

wherein the first roll carries the free flowing granular material from the hopper to the trough region through the mouth; and wherein the cylindrical roll body is gravitationally above the auger with the second width of the cylindrical roll body overlapping the first width of the auger such that the auger is completely vertically covered by the cylindrical roll body.

2. The hopper spreader apparatus of claim 1, wherein an outer periphery of the first roll includes at least one pocket portion that dispenses a volume of the free flowing granular material into the trough region as the first roll rotates about the first roll axis of rotation.

3. The hopper spreader apparatus of claim 1, wherein, an outer periphery of the first roll including at least one pocket portion that dispenses a predetermined volume of the free flowing granular material into the trough region for each rotation of the first roll about the first roll axis of rotation.

4. The hopper spreader apparatus of claim 3, wherein the first roll further includes at least one radially outward extending piece of flighting extending radially outward from an outer surface of the cylindrical roll body, the piece of flighting defining, at least a portion of the at least one pocket portion, the flighting extending longitudinally between first and second ends along the first roll axis a greater extent than the flighting extends radially outward from the cylindrical roll body.

5. The hopper spreader apparatus of claim 3, wherein:
the first roll further includes a plurality of radially outward extending pieces of flighting extending radially outward from an outer surface of the cylindrical roll body, each piece of flighting extending longitudinally between first and second ends along the first roll axis a greater extent than the flighting extends radially outward from the cylindrical roll body, the pieces of flighting being angularly spaced apart about the first roll axis of rotation; and angularly adjacent pieces of flighting defining a pocket portion therebetween.

6. The hopper spreader apparatus of claim 5, wherein the pieces of flighting extends axially along the cylindrical roll body in a non-planar fashion.

7. The hopper spreader apparatus of claim 3, wherein:
the mouth defines an inlet side and an outlet side, the pocket portion enters the trough region through the inlet side of the mouth and the pocket portion exits the trough region through the outlet side of the mouth as the first roll rotates about the first roll axis of rotation;
the trough region defines a first roll mating region proximate the inlet side of the mouth;
the outer periphery of the first roll substantially mating with the first roll mating region inhibiting the free flow of the free flowing granular material into the trough region from the storage cavity between the first roll and the first roll mating region along a majority of a length of the first roll along the first axis.

8. The hopper spreader apparatus of claim 7, wherein the first roll mating region extends angularly about the first roll axis of rotation a first amount and the at least one pocket portion extends angularly about the first roll axis of rotation a second amount, the first amount being at least seventy five percent of the second amount.

9. The hopper spreader apparatus of claim 8, wherein the first amount is at least equal to the second amount.

10. The hopper spreader apparatus of claim 7, wherein the first roll and the hopper defines an inlet portion of the mouth at the inlet side of the mouth defining a clearance gap having a gap width between the outer periphery of the first roll and the hopper, the gap width being such that less than fifteen percent of the free flowing granular material from the hopper flows to the conveying unit without being conveyed by the first roll.

11. The hopper spreader apparatus of claim 3, wherein:
the mouth defines an inlet side and an outlet side, the pocket portion enters the trough region through the inlet side of the mouth and the pocket portion exits the trough region through the outlet side of the mouth as the first roll rotates about the first roll axis of rotation;
the inlet side of the mouth defining a first clearance between the outer periphery of the first roll and the trough region;
the outlet side of the mouth defining a second clearance between the outer periphery of the first roll and the trough region;
the first and second clearances being such that no more than 10% of the free flowing granular material flows from the hopper to the trough region without being conveyed by the first roll within the at least one pocket portion.

12. The hopper spreader apparatus of claim 11, wherein at least one of the first and second clearances is adjustable to accommodate free flowing granular materials having different flow characteristics.

13. The hopper spreader apparatus of claim 11, wherein the free flowing granular material is dry salt for melting snow and/or ice on a road.

14. The hopper spreader apparatus of claim 11, wherein the free flowing granular material is dry sand used to increase traction on a road covered with snow and/or ice.

15. The hopper spreader apparatus of claim 3, wherein the outer periphery of the first roll cooperates with the mouth and the trough region such that no more than 10% of the free flowing granular material flows from the hopper to the trough region without being conveyed by the first roll within the at least one pocket portion.

16. The hopper spreader apparatus of claim 15, wherein the at least one pocket portion includes at least two pocket portions.

17. The hopper spreader apparatus of claim 15, wherein the free flowing granular material is dry salt for melting snow and/or ice on a road.

18. The hopper spreader apparatus of claim 15, wherein the free flowing granular material is dry sand used to increase traction on a road covered with snow and/or ice.

19. The hopper spreader apparatus of claim 1, wherein the first roll controls the free flow of the free flowing granular material from the hopper to the conveying unit at substantially an uniform rate along the length of the first roll.

20. The hopper spreader apparatus of claim 19, wherein:
the conveying unit has a maximum conveying rate at which the free flowing granular material can be conveyed toward the spreading unit;
the maximum conveying rate being less than free flow of the free flowing granular material to the conveying unit;
the first roll controls a total flow of the free flowing granular material from the hopper to the conveying unit to be no greater than the maximum conveying rate.

21. The hopper spreader apparatus of claim 1, wherein:
the conveying unit has a maximum conveying rate at which the free flowing granular material can be conveyed toward the spreading unit;
the maximum conveying rate being less than free flow of the free flowing granular material to the conveying unit;
the first roll controls a total flow of the free flowing granular material from the hopper to the conveying unit to be no greater than the maximum conveying rate.

22. The hopper spreader apparatus of claim 1, wherein the first roll axis of rotation is parallel to the auger axis of rotation.

23. The hopper spreader apparatus of claim 22, wherein the auger conveys the free flowing granular material in a direction parallel to the auger axis of rotation, the first roll conveys the free flowing granular material to the auger in a direction perpendicular to the auger axis of rotation and the first roll axis of rotation.

24. The hopper spreader apparatus of claim 22, wherein the auger and the first roll are operably coupled by a transmission and are driven by a single drive motor.

25. The hopper spreader apparatus of claim 24, wherein the transmission is configured such that the auger rotates at a first rate and the first roll rotates at a second rate that is less than the first rate.

26. The hopper spreader apparatus of claim 22, including a first motor coupled to the auger to rotate the auger at a first rate of rotation and a second motor coupled to the first roll to rotate the first roll at a second rate of rotation, the first and second motors independently controllable to independently control the first and second rates of rotation.

27. The hopper spreader apparatus of claim 1, wherein the spreading unit is a spinner assembly that rotates to spread the free flowing granular material.

28. The hopper spreader apparatus of claim 1, wherein the free flowing granular material is dry salt for melting snow and/or ice on a road.

29. The hopper spreader apparatus of claim 1, wherein the free flowing granular material is dry sand used to increase traction on a road covered with snow and/or ice.

30. The hopper spreader apparatus of claim 1, wherein the first roll further includes at least one radially outward extending piece of flighting extending radially outward from an outer surface of the cylindrical roll body.

31. A method of spreading granular material comprising:
storing, in a hopper spreader apparatus according to claim 1, free flowing granular material in the hopper;
spreading the free flowing granular material using the spreading unit;
transporting the free flowing granular material from the hopper to the spreading unit using the dispensing system including:
conveying the free flowing granular material toward the spreading unit with the conveying unit;
controlling a free flow of the free flowing granular material from the hopper to the conveying unit with the rotating first roll, wherein controlling a free flow of the free flowing granular material inhibits the free flow of the free flowing granular material to the conveying unit.

32. The method of claim 31, wherein controlling a flow of free flowing granular material from the hopper to the conveying unit with the rotating first roll includes supplying the free flowing granular material to the conveying unit from the rotating first roll at a uniform rate, the uniform rate being less than a rate of free flow, along a length of the rotating first roll.

33. The method of claim 32, wherein the conveying unit can convey the free flowing granular material toward the spreading unit at a maximum rate and wherein the step of controlling a free flow of the free flowing granular material from the hopper to the conveying unit limits the supply of the free flowing granular material from the hopper to the conveying unit to no greater than the maximum rate, the maximum conveying rate being less than free flow of granular material to the conveying unit.

34. The method of claim 31, wherein controlling a free flow of granular material from the hopper to the conveying unit with the rotating first roll includes conveying the free flowing granular material from the hopper to the conveying unit in at least one pocket portion formed in an outer periphery of the first rotating roll.

35. A hopper spreader apparatus for spreading free flowing granular material comprising:
a hopper having a storage cavity for storing the free flowing granular material to be spread;
a spreading unit for spreading the free flowing granular material;
a dispensing system positioned to transport free flowing granular material from the hopper to the spreading unit, the dispensing system including:
a conveying unit for conveying the free flowing granular material toward the spreading unit, the conveying unit including an auger that rotates about an auger axis of rotation, the auger having a first outer diameter that provides a first width that is perpendicular to gravity and the auger axis of rotation, the conveying unit being located within a trough region, the conveying unit being located within a trough region defining a mouth, the mouth opening towards the storage cavity of the hopper, the free flowing granular material within the hopper entering into the trough region through the mouth; and a rotating first roll limiting a free flow of the free flowing granular material from the hopper to the conveying unit, the first roll having a cylindrical roll body defining a second outer diameter that is greater than the first outer diameter, the cylindrical roll body rotatable about a first roll axis of rotation, the first roll having a second width that is perpendicular to the first roll axis of rotation and perpendicular to gravity, the cylindrical roll body being gravitationally above the auger with the second width of the cylindrical roll body overlapping the first width of the auger such that the auger is completely vertically covered by the cylindrical roll body.

* * * * *

UNITED STATES PATENT AND TRADEMARK OFFICE
CERTIFICATE OF CORRECTION

PATENT NO. : 10,745,875 B2
APPLICATION NO. : 14/884426
DATED : August 18, 2020
INVENTOR(S) : Robert N. Gamble, II et al.

It is certified that error appears in the above-identified patent and that said Letters Patent is hereby corrected as shown below:

In the Claims

In Claim 1, Column 15, Line 11, the word "gravit" should read "gravity".

Signed and Sealed this
Twentieth Day of October, 2020

Andrei Iancu
*Director of the United States Patent and Trademark Office*